US 9,554,299 B2

(12) United States Patent
Seo et al.

(10) Patent No.: US 9,554,299 B2
(45) Date of Patent: *Jan. 24, 2017

(54) METHOD AND DEVICE FOR APERIODICALLY REPORTING CHANNEL STATE INFORMATION IN WIRELESS CONNECTION SYSTEM

(71) Applicant: LG ELECTRONICS INC., Seoul (KR)

(72) Inventors: Hanbyul Seo, Anyang-si (KR); Kijun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/790,814

(22) Filed: Jul. 2, 2015

(65) Prior Publication Data

US 2015/0312791 A1    Oct. 29, 2015

Related U.S. Application Data

(63) Continuation of application No. 13/885,919, filed as application No. PCT/KR2011/008800 on Nov. 17, 2011, now Pat. No. 9,107,211.

(Continued)

(51) Int. Cl.
*H04W 4/00* (2009.01)
*H04W 24/10* (2009.01)
(Continued)

(52) U.S. Cl.
CPC .......... *H04W 24/10* (2013.01); *H04B 7/0626* (2013.01); *H04L 1/003* (2013.01); *H04L 1/0026* (2013.01);
(Continued)

(58) Field of Classification Search
CPC ... H04W 24/10; H04W 72/042; H04B 7/0626; H04L 1/003; H04L 1/0026; H04L 1/0027; H04L 1/06
See application file for complete search history.

(56) References Cited

U.S. PATENT DOCUMENTS 9,219,571 B2 * 12/2015 Barbieri ................ H04L 1/0026
2009/0190528 A1 * 7/2009 Chung ................ H04B 7/0417
370/328

(Continued)

FOREIGN PATENT DOCUMENTS

KR  10-2010-0058399 A  6/2010
KR  10-2010-0088554 A  8/2010

OTHER PUBLICATIONS

3GPP, "Technical Specification Group Radio Access Network; Evolved Universal Terrestrial Radio Access (E-UTRA); Physical layer procedures (Release 9)", 3GPP TS 36.213, V9.2.0, Jun. 2010, 80 pages provided.

*Primary Examiner* — Clemence Han
(74) *Attorney, Agent, or Firm* — Birch, Stewart, Kolasch & Birch, LLP

(57) ABSTRACT

A method for aperiodic channel status information (CSI) reporting in a wireless access system, and a user equipment (UE) for performing the method are discussed. The method is performed by a user equipment (UE) and includes receiving a radio resource control (RRC) message configuring one or more CSI measurement sets. Each of the one or more CSI measurement sets includes one or more subframes. The method includes receiving a physical downlink control channel (PDCCH) including a CSI request field triggering the aperiodic CSI reporting; and reporting a CSI on a subframe 'n'. The CSI has been measured on a subframe 'n-$n_{CQI\_ref}$'. '$n_{CQI\_ref}$' is a value which makes the subframe (Continued)

'n-$n_{CQI\_ref}$' to be included in a valid CSI measurement set which is closest from the subframe 'n'.

8 Claims, 16 Drawing Sheets

Related U.S. Application Data

(60) Provisional application No. 61/414,880, filed on Nov. 17, 2010, provisional application No. 61/431,832, filed on Jan. 11, 2011, provisional application No. 61/432,595, filed on Jan. 14, 2011.

(51) Int. Cl.
| | | |
|---|---|---|
| *H04L 1/00* | (2006.01) | |
| *H04W 72/04* | (2009.01) | |
| *H04B 7/06* | (2006.01) | |
| *H04L 1/06* | (2006.01) | |

(52) U.S. Cl.
CPC .......... *H04L 1/0027* (2013.01); *H04W 72/042* (2013.01); *H04L 1/06* (2013.01)

(56) References Cited

U.S. PATENT DOCUMENTS

| | | | | |
|---|---|---|---|---|
| 2011/0103247 A1* | 5/2011 | Chen | .................... | H04B 7/0452 370/252 |
| 2011/0249578 A1* | 10/2011 | Nayeb Nazar | ........ | H04L 1/0027 370/252 |
| 2011/0274071 A1 | 11/2011 | Lee et al. | | |
| 2011/0281585 A1* | 11/2011 | Kwon | .................... | H04L 1/0002 455/436 |
| 2011/0299484 A1* | 12/2011 | Nam | ...................... | H04L 1/0025 370/329 |
| 2012/0076017 A1* | 3/2012 | Luo | ........................ | H04L 1/0027 370/252 |
| 2012/0093012 A1* | 4/2012 | Pedersen | .............. | H04B 7/0626 370/252 |
| 2012/0113816 A1* | 5/2012 | Bhattad | ................. | H04L 5/0032 370/246 |
| 2012/0134275 A1* | 5/2012 | Choi | ..................... | H04L 5/0057 370/241 |
| 2012/0165029 A1* | 6/2012 | Lindbom | .................. | H04L 5/00 455/450 |
| 2013/0148600 A1* | 6/2013 | Moulsley | ............... | H04B 7/024 370/329 |
| 2013/0182674 A1* | 7/2013 | Lunttila | ................. | H04L 5/001 370/329 |
| 2013/0288730 A1 | 10/2013 | Gomadam et al. | | |
| 2013/0301450 A1 | 11/2013 | Geirhofer et al. | | |
| 2013/0343317 A1 | 12/2013 | Etemad et al. | | |
| 2014/0064237 A1 | 3/2014 | Lee et al. | | |
| 2014/0071848 A1 | 3/2014 | Park et al. | | |
| 2014/0160967 A1 | 6/2014 | Gao et al. | | |
| 2014/0308905 A1 | 10/2014 | Miao et al. | | |

* cited by examiner

FIG. 5
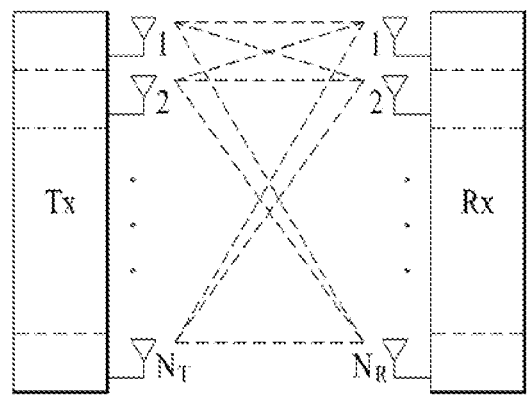
(a)
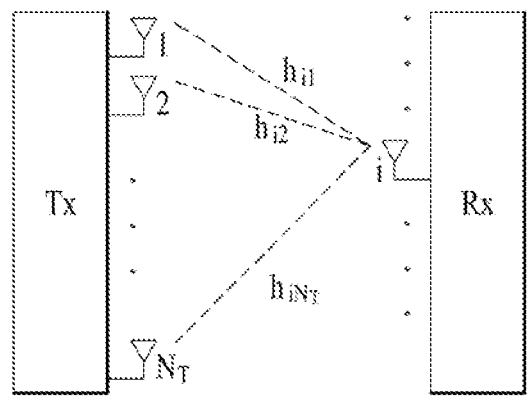
(b)

FIG. 6
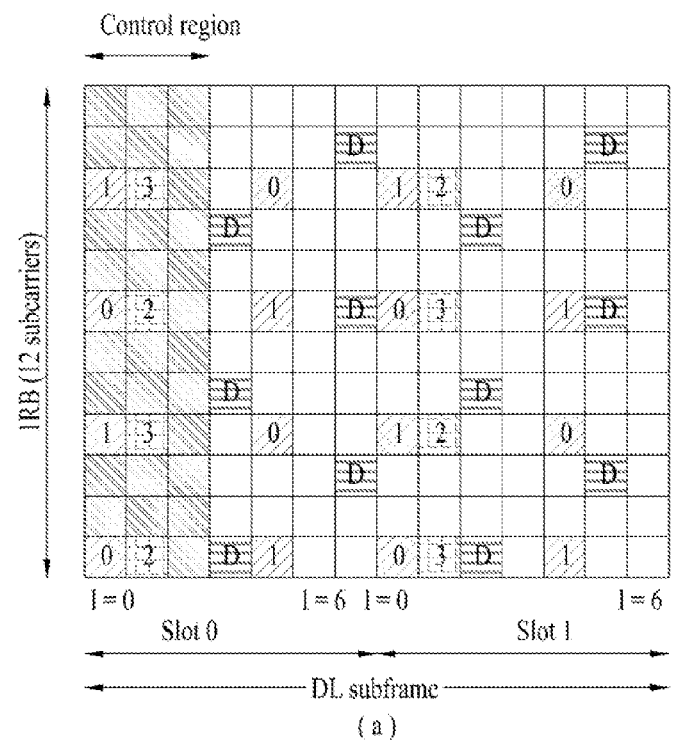
(a)
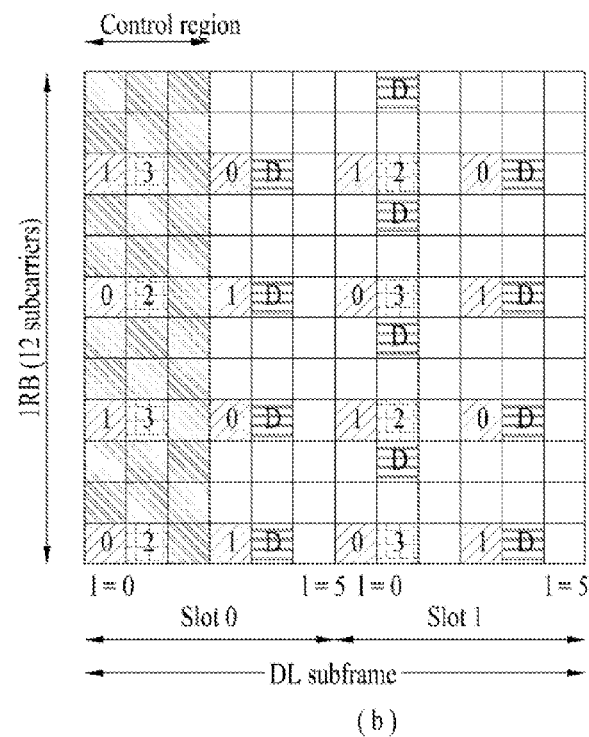
(b)

METHOD AND DEVICE FOR APERIODICALLY REPORTING CHANNEL STATE INFORMATION IN WIRELESS CONNECTION SYSTEM

CROSS-REFERENCE TO RELATED APPLICATIONS

This application is a Continuation of pending U.S. application Ser. No. 13/885,919 filed on May 16, 2013, which is the National Phase of PCT/KR2011/008800 filed on Nov. 17, 2011, which claims priority under 35 U.S.C. §119(e) to U.S. Provisional Application Nos. 61/414,880 filed on Nov. 17, 2010, 61/431,832 filed on Jan. 11, 2011, and 61/432,595 filed on Jan. 14, 2011. The entire contents of all of the above applications are hereby incorporated by reference.

BACKGROUND OF THE INVENTION

Field of the Invention

The present invention relates to a wireless communication system, and more particularly, to various methods of reporting channel status information to a base station and apparatus for supporting the same.

Discussion of the Related Art

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

A user equipment periodically can transmit channel status information (CSI) to a base station. Alternatively, if a base station makes a request, the user equipment can aperiodically report CSI to the base station.

In LTE-A system, in case that a CSI reference resource belongs to a CSI measurement set, a user equipment just reports a CSI corresponding to the CSI reference resource to a base station. However, if a CSI reference resource does not belong to any CSI measurement set, it may cause a problem that a CSI to be reported does not exist.

SUMMARY OF THE INVENTION

Accordingly, the present invention is directed to a mobile terminal and controlling method thereof that substantially obviate one or more problems due to limitations and disadvantages of the related art. And, the technical task of the present invention is to provide a method of reporting an efficient channel status information.

Another technical task of the present invention is to provide methods of reporting a CSI in case of a presence of at least one CSI measurement sets for a specific user equipment.

A further technical task of the present invention is to provide methods for a user equipment to report a CSI to a base station in case of a non-presence of a CSI reference resource (e.g., a considered subframe) in a CSI measurement set assigned to the user equipment.

Another further technical task of the present invention is to provide apparatuses for supporting the above-mentioned methods.

Technical tasks obtainable from the present invention are non-limited by the above-mentioned technical task. And, other unmentioned technical tasks can be clearly understood from the following description by those having ordinary skill in the technical field to which the present invention pertains.

The present invention relates to a wireless communication system, and more particularly, to methods of reporting channel status information to a base station and apparatus for supporting the same.

To achieve these and other advantages and in accordance with the purpose of the present invention, as embodied and broadly described, a method of reporting a CSI (channel state information), which is aperiodically reported by a user equipment, according to one embodiment of the present invention may include the steps of receiving an upper layer signal including a measurement set information on at least one CSI measurement set assigned to the user equipment by a base station, receiving a Physical downlink control channel (PDCCH) signal including a CSI request field for requesting a reporting of the CSI in a first subframe from the base station, configuring a second subframe considered on the basis of the first subframe as a CSI reference resource, and determining whether the CSI reference resource is included in the assigned at least one CSI measurement set.

Preferably, the method may further include the steps of if the CSI reference resource is not included in the assigned at least one CSI measurement set, reconfiguring the considered second subframe, which is a third subframe closest to the CSI reference resource detected by the user equipment, as the CSI reference resource and transmitting the CSI corresponding to the third subframe to the base station via a Physical uplink shared channel (PUSCH) signal.

Preferably, the method may further include the step of if the CSI reference resource is included in the assigned at least one CSI measurement set, transmitting the CSI for the CSI reference resource to the base station via a Physical uplink shared channel (PUSCH) signal.

Preferably, the method may further include the step of checking whether the considered second subframe is a valid subframe.

More preferably, the step of checking whether the considered second subframe is the valid subframe may include the step of checking whether the second subframe is included in the at least one CSI measurement set.

In this case, in the step of checking whether the considered second subframe is a valid subframe, the second subframe preferably meets the conditions including: (1) the second subframe is configured as a DL subframe for the user equipment; (2) the second subframe is not an MBSFN subframe; (3) if a length of DwPTS field is equal to or smaller than 7680·TS, the second subframe does not include the DwPTS field; and (4) the second subframe should not be configured as a measurement gap for the user equipment.

To further achieve these and other advantages and in accordance with the purpose of the present invention, a method of reporting a CSI (channel state information), which is aperiodically reported by a user equipment, according to another embodiment of the present invention may include the steps of receiving a Physical downlink control channel (PDCCH) signal including a CSI request field including a measurement set information on at least one CSI measurement set assigned to the user equipment to request a reporting of the CSI and transmitting a Physical uplink shared channel (PUSCH) signal including the CSI for the CSI measurement set to a base station.

To further achieve these and other advantages and in accordance with the purpose of the present invention, a method of reporting a CSI (channel state information), which is aperiodically reported by a user equipment, according to another embodiment of the present invention may include the steps of receiving a Physical downlink control channel (PDCCH) signal including a CSI request field including a portion of a measurement set information on at least one CSI measurement set assigned to the user equipment to request a reporting of the CSI, receiving an upper layer signal including a second CSI request field including the rest of the measurement set information, and transmitting a Physical uplink shared channel (PUSCH) signal including the CSI for the at least one CSI measurement set to a base station based on the first CSI request field and the second CSI request field.

To further achieve these and other advantages and in accordance with the purpose of the present invention, a user equipment, which aperiodically reports a CSI (channel state information), according to another embodiment of the present invention may include a transmitting module configured to transmit a radio signal, a receiving module configured to receive a radio signal, and a processor configured to control an aperiodic CSI reporting.

In this case, using the transmitting module and the receiving module, the processor may control the steps of receiving an upper layer signal including a measurement set information on at least one CSI measurement set assigned to the user equipment by a base station, receiving a Physical downlink control channel (PDCCH) signal including a CSI request field for requesting a reporting of the CSI in a first subframe from the base station, configuring a second subframe considered on the basis of the first subframe as a CSI reference resource, and determining whether the CSI reference resource is included in the assigned at least one CSI measurement set.

Preferably, if the CSI reference resource is not included in the assigned at least one CSI measurement set, the processor may further control the step of reconfiguring the considered second subframe, which is a third subframe closest to the CSI reference resource detected by the user equipment, as the CSI reference resource and transmitting the CSI corresponding to the third subframe to the base station via a Physical uplink shared channel (PUSCH).

Preferably, if the CSI reference resource is included in the assigned at least one CSI measurement set, the processor may further control the step of transmitting the CSI for the CSI reference resource to the base station via a Physical uplink shared channel (PUSCH) signal.

More preferably, the processor may further control the step of checking whether the considered second subframe is a valid subframe. In this case, in order to check whether the considered second subframe is the valid subframe, the processor may check whether the second subframe is included in the at least one CSI measurement set.

Moreover, in order to check whether the considered second subframe is a valid subframe, the processor may further check whether the second subframe meets the conditions including: (1) the second subframe is configured as a DL subframe for the user equipment; (2) the second subframe is not an MBSFN subframe; (3) if a length of DwPTS field is equal to or smaller than 7680·TS, the second subframe does not include the DwPTS field; and (4) the second subframe should not be configured as a measurement gap for the user equipment.

To further achieve these and other advantages and in accordance with the purpose of the present invention, a user equipment, which aperiodically reports a CSI (channel state information), according to a further embodiment of the present invention may include a transmitting module configured to transmit a radio signal, a receiving module configured to receive a radio signal, and a processor configured to control an aperiodic CSI reporting.

In this case, using the transmitting module and the receiving module, the processor may control the steps of receiving a Physical downlink control channel (PDCCH) signal including a CSI request field including a measurement set information on at least one CSI measurement set assigned to the user equipment to request a reporting of the CSI and transmitting a Physical uplink shared channel (PUSCH) signal including the CSI for the CSI measurement set to a base station.

To further achieve these and other advantages and in accordance with the purpose of the present invention, a user equipment, which aperiodically reports a CSI (channel state information), according to another further embodiment of the present invention may include a transmitting module configured to transmit a radio signal, a receiving module configured to receive a radio signal, and a processor configured to control an aperiodic CSI reporting.

In this case, using the transmitting module and the receiving module, the processor may control the steps of receiving a Physical downlink control channel (PDCCH) signal including a CSI request field including a portion of a measurement set information on at least one CSI measurement set assigned to the user equipment to request a reporting of the CSI, receiving an upper layer signal including a second CSI request field including the rest of the measurement set information, and transmitting a Physical uplink shared channel (PUSCH) signal including the CSI for the at least one CSI measurement set to a base station based on the first CSI request field and the second CSI request field.

The above-mentioned general description of the various embodiments of the present invention corresponds to portions of preferred embodiments of the present invention only. And, various embodiments reflecting the technical features of the present invention can be derived from the following details of the present invention by those having ordinary skill in the art to which the present invention pertains.

According to embodiments of the present invention, the following effects can be provided.

First of all, a user equipment can report channel status information to a base station efficiently.

Secondly, if at least one CSI measurement set is assigned to a specific user equipment, the user equipment can report a CSI to a base station accurately and effectively.

Thirdly, even if a CSI reference resource for a user equipment does not exist in a CSI measurement set assigned to the user equipment, the user equipment can perform an aperiodic CSI reporting.

Effects attainable from the embodiments of the present invention are non-limited to the above-mentioned effects. Other unmentioned effects can be clearly derived and understood from the description of the following embodiments of the present invention by those having ordinary skill in the art to which the present invention pertains. Namely, effects unintended in the application stage of the present invention can be derived from the embodiments of the present invention by those having ordinary skill in the art to which the present invention pertains.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 5 is a diagram for a configuration of a wireless communication system having multiple antennas.

FIG. 6 is a diagram of one example of a reference signal pattern mapped to a downlink resource block (RB) pair defined in 3GPP LTE system.

DETAILED DESCRIPTION OF THE INVENTION

Figure 1:
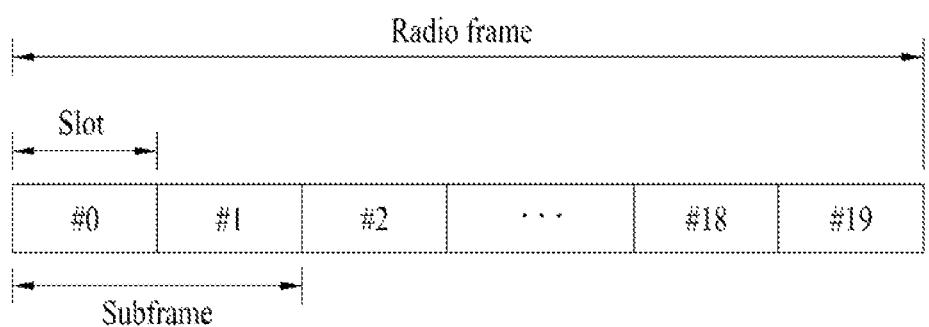
FIG. 1 is a diagram for a structure of a downlink radio frame usable for embodiments of the present invention.

The present invention relates to a wireless communication system, and methods of reporting channel status information to a base station and apparatus for supporting the same are disclosed as follows.

First of all, the following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment.

In the description of drawings, procedures or steps, which may ruin the substance of the present invention, are not explained. And, procedures or steps, which can be understood by those skilled in the art, are not explained as well.

In this disclosure, embodiments of the present invention are described centering on the data transmission/reception relations between a base station and a terminal. In this case, the base station is meaningful as a terminal node of a network which directly performs communication with the terminal. In this disclosure, a specific operation explained as performed by a base station can be performed by an upper node of the base station in some cases.

In particular, in a network constructed with a plurality of network nodes including a base station, it is apparent that various operations performed for communication with a terminal can be performed by a base station or other networks except the base station. In this case, 'base station' can be replaced by such a terminology as a fixed station, a Node B, an eNode B (eNB), an advanced base station (ABS), an access point and the like.

And, a terminal can be replaced by such a terminology as a user equipment (UE), a mobile station (MS), a subscriber station (SS), a mobile subscriber station (MSS), a mobile terminal, an advanced mobile station (AMS) and the like.

Moreover, a transmitting end means a node that transmits a data service or a speech service. And, a receiving end means a node that receives a data service or a speech service. Hence, a mobile station can become a transmitting end and a base station can become a receiving end, in uplink. Likewise, a mobile station becomes a receiving end and a base station can become a transmitting end, in downlink.

Embodiments of the present invention are supportable by standard documents disclosed in at least one of wireless access systems including IEEE 802.xx system, 3GPP (3rd generation partnership project) system, 3GPP LTE system and 3GPP2 system, and particularly, by 3GPP TS 36.211, 3GPP TS 36.212m 3GPP TS 36.213 and 3GPP TS 36.321. In particular, the steps or parts, which are not explained to clearly reveal the technical idea of the present invention, in the embodiments of the present invention can be supported by the above documents.

In the following description, a preferred embodiment of the present invention is explained in detail with reference to the accompanying drawings. Detailed description disclosed together with the accompanying drawings is intended to explain not a unique embodiment of the present invention but an exemplary embodiment of the present invention.

In the following description, specific terminologies used for embodiments of the present invention are provided to help the understanding of the present invention. And, the use of the specific terminology can be modified into another form within the scope of the technical idea of the present invention.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like.

CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), LTE-A, etc.

UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE. Although the following description mainly concerns 3GPP LTE/LTE-A system to clearly describe the technical features of the present invention, the technical idea of the present invention may be applicable to IEEE 802.16e/m system.

I. Basic Structure of 3GPP LTE/LTE-A System

FIG. 1 is a diagram for a structure of a downlink radio frame usable for embodiments of the present invention.

First of all, a radio frame includes 10 subframes. Each of the subframes includes 2 slots. In this case, a time taken to transmit one subframe is defined as a transmission time interval (hereinafter abbreviated TTI). For instance, one subframe may have a length of 1 ms and one slot may have a length of 0.5 ms.

One slot may include a plurality of OFDM (orthogonal frequency division multiplexing) symbols in time domain and may include a plurality of resource blocks (RBs) in frequency domain. Since 3GPP system uses OFDMA scheme in downlink, OFDM symbol is used to indicate one symbol period. Namely, the OFDM symbol may be named SC-FDMA symbol or symbol period. Resource block (RB) is a resource allocation unit and may include a plurality of contiguous subcarriers in one slot.

The radio subframe structure shown in FIG. 1 shows one example only, and the number of subframes included in a radio frame, the number of slots included in the subframe, and the number of OFDM symbols included in the slot can be modified in various ways.

Figure 2:
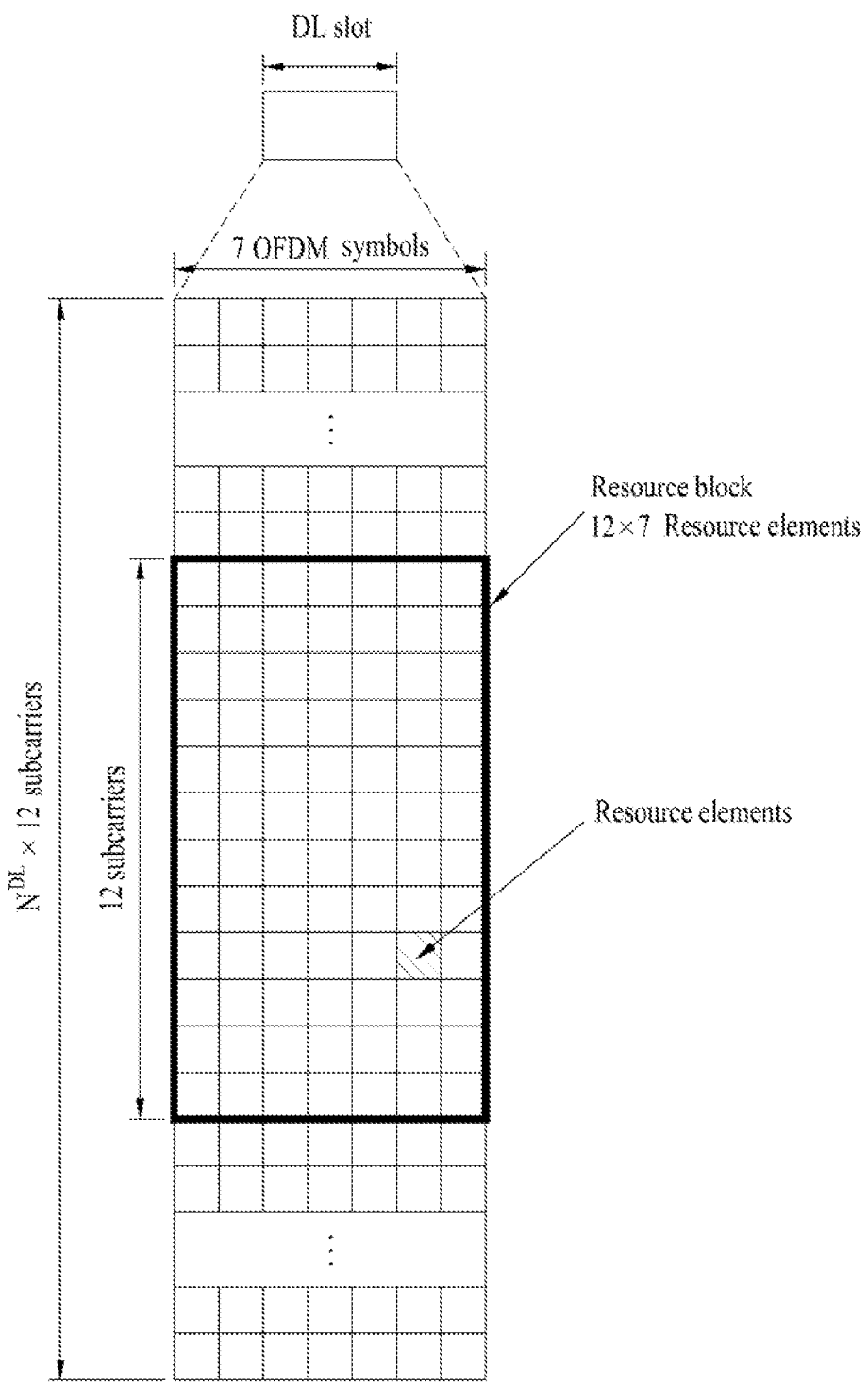
FIG. 2 is a diagram of a resource grid for a downlink slot usable for embodiments of the present invention.

FIG. 2 is a diagram of a resource grid for a downlink slot usable for embodiments of the present invention.

First of all, a downlink (DL) slot includes a plurality of OFDM symbols in time domain. In FIG. 2, one DL slot may include 7 OFDM symbols in time domain and one resource block (RB) may include 12 subcarriers in frequency domain, by which the present invention may be non-limited.

For instance, each element on a resource grid may be called a resource element (RE). One resource block (RB) includes 12×7 resource elements (REs). $N^{DL}$ indicates the number of resource blocks included in a DL slot and depends on a DL transmission bandwidth.

Figure 3:
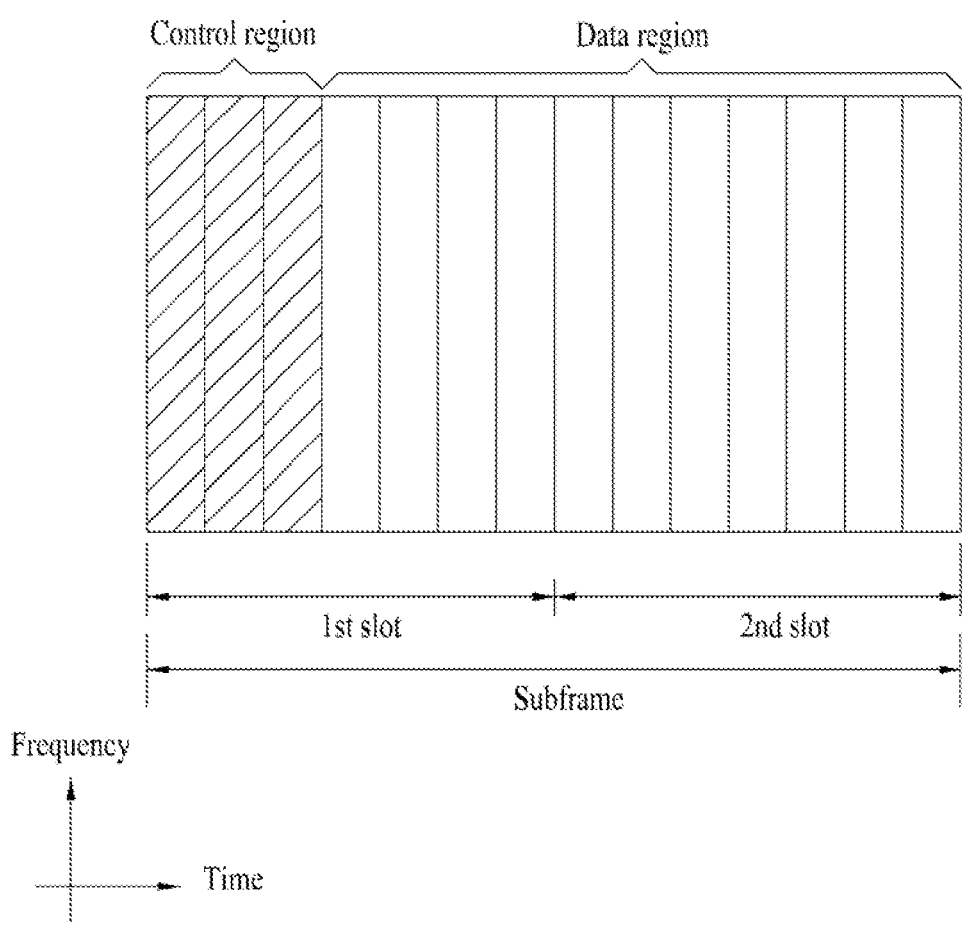
FIG. 3 is a diagram for one example of a structure of a downlink subframe usable for embodiments of the present invention.

FIG. 3 is a diagram for a structure of a downlink (DL) subframe usable for embodiments of the present invention.

First of all, a subframe includes 2 slots in time domain. Maximum 3 OFDM symbols situated in a head part of a first slot within a subframe correspond to a control region to which control channels are assigned. The rest of OFDM symbols correspond to a data region to which PDSCH (physical downlink shared channel) is assigned.

DL control channels used by 3GPP LTE system may include PCFICH (Physical Control Format Indicator Channel), PDCCH (Physical Downlink Control Channel), PHICH (Physical hybrid automatic repeat request indicator Channel) and the like. PCFICH signal transmitted in a first OFDM symbol of a subframe carries information on the number of OFDM symbols (i.e., a size of a control region) used for a transmission of a control channel signal within the subframe. The PHICH carries ACK/NACK (acknowledgement/non-acknowledgement) signal for uplink (UL) HARQ (hybrid automatic repeat request). In particular, ACK/NACK signal for UL data transmitted by a user equipment (UE) is transmitted on PHICH.

Control information carried on PDCCH may be called downlink control information (DCI). The DCI includes a resource allocation information for a user equipment (UE) or a UE group and other control informations. For instance, the DCI may include a UL resource allocation information, a DL resource allocation information, a UL transmission power control command and the like.

The PDCCH may include a transmission format and resource allocation information of DL-SCH (downlink shared channel), a transmission format and resource allocation information of UL-SCH (uplink shared channel), a paging information on PCH (paging channel), a system information on DL-SCH, a resource allocation of such an upper layer control message as a random access response transmitted on PDSCCH, an information on a transmission power control command set for individual UEs within a random UE group, an information on a transmission power control command, an information on activation of VoIP (voice over IP) and the like.

A plurality of PDCCHs can be transmitted in a single control region and a user equipment (UE) can monitor a plurality of the PDCCHs. The PDCCH can be transmitted on at least one or more contiguous CCEs (control channel elements). The CCE is a logical assignment unit that is used to provide the PDCCH at a single coding rate based on a status of a radio channel. The CCE may correspond to a plurality of REGs (resource element groups). A format of the PDCCH and the number of available bits of the PDCCH may be determined depending on the correlation between the number of CCEs and a coding rate provided by the CCE. A base station determines a PDCCH format in accordance with a DCI which is to be transmitted to a user equipment. The base station then attaches a CRC (cyclic redundancy check) to a control information.

The CRC is masked with a unique identifier (i.e., RNTI (radio network temporary identifier)) in accordance with a PDCCH using method or an owner. If the PDCCH is provided for a specific user equipment, the CRC may be masked with a unique identifier (e.g., Cell-RNTI (C-RNTI)) of the corresponding user equipment. If the PDCCH is provided for a paging message, the CRC may be masked with a paging indicator identifier (e.g., P-RNTI (Paging-RNTI)). If the PDCCH is provided for system information (particularly, a system information block), the CRC may be masked with a system information identifier and a system information RNTI (SI-RNTI). In order to indicate a random access response to a reception of a random access preamble of a user equipment, the CRC may be masked with RA-RNTI (random access-RNTI).

In a carrier aggregation environment, PDCCH can be transmitted on at least one component carrier and may include a resource allocation information on the at least one component carrier. For instance, although PDCCH is transmitted on a single component carrier, it may include resource allocation information on at least one PDSCH and PUSCH.

Figure 4:
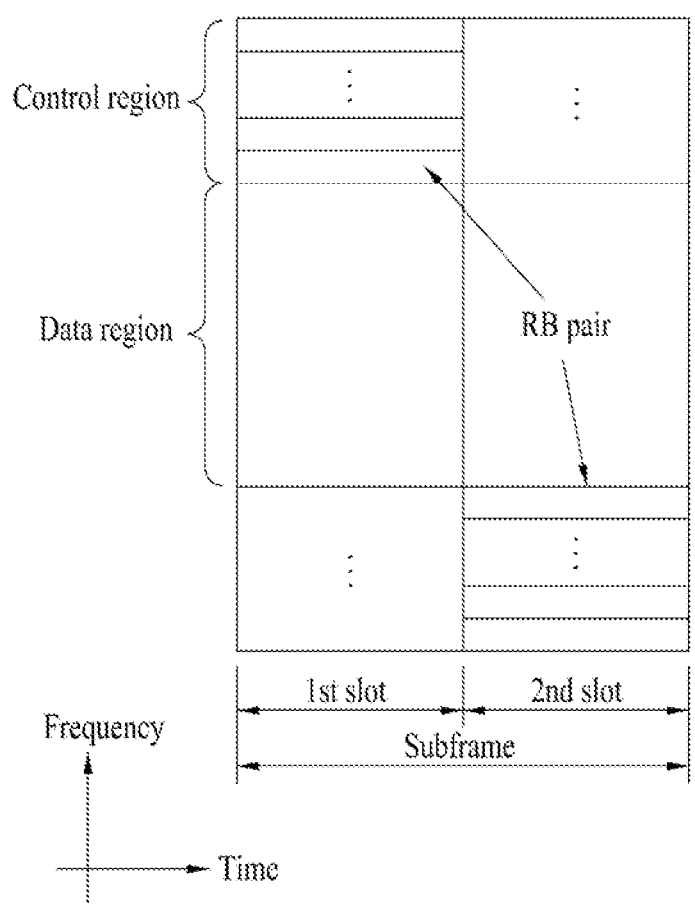
FIG. 4 is a diagram for a structure of an uplink subframe usable for embodiments of the present invention.

FIG. 4 is a diagram for one example of a structure of an uplink (UL) subframe usable for embodiments of the present invention.

Referring to FIG. 4, a UL subframe includes a plurality of slots (e.g., 2 slots). Each of the slot may include SC-FDMA symbols of which number varies depending on a cyclic prefix (CP) length. The UL subframe may be divided into a control region and a data region in frequency domain. The data region includes a physical UL shared channel (PUSCH) and is used to transmit a data signal including audio information. The control region includes a physical UL control channel (PUCCH) and is used to transmit uplink control information (UCI). The PUCCH includes a resource block pair (RB pair) located at both ends of the data region on a frequency axis and hops on the boundary of a slot.

In LTE system, in order to maintain single carrier property, a user equipment does not transmit PUCCH and PUSCH simultaneously. Yet, in LTE-A system, both PUCCH signal and PUSCH signal can be simultaneously transmitted in the same subframe in accordance with a transmission mode of a user equipment in a manner that the PUCCH signal is piggybacked on the PUSCH signal. And, the user equipment can transmit UL control information via PUSCH in accordance with a channel status.

PUCCH for one user equipment may be assigned to a resource block pair (RB pair) in a subframe. Resource blocks belonging to the RB pair may occupy different subcarriers in 2 slots, respectively. Namely, it can be expressed as the RB pair assigned to PUCCH is frequency-hopping on a slot boundary.

PUCCH can be used to transmit the following control informations.

SR (scheduling request): This information is used to request an uplink UL-SCH resource. This information is transmitted by OOK (on-off keying).

HARQ ACK/NACK: This is a response signal to a UL data packet on PDSCH or a PDCCH indicating an SPS (semi-persistent scheduling) release. HARQ ACK/NACK signal indicates whether the DL data packet or the PDCCH indicating the SPS release has been successfully received. 1-bit ACK/NACK is transmitted in response to a single DL codeword. 2-bit ACK/NACK is transmitted in response to two DL codewords. In case of TDD, ACK/NACK responses to a plurality of DL subframes are aggregated and then transmitted on a single PUCCH by bundling or multiplexing.

CQI (channel quality indicator) or CSI (channel state information); This is feedback information on a DL channel. MIMO (multiple input multiple output) related feedback information includes RI (rank indicator) and PMI (precoding matrix indicator). 20 bits per subframe are used. In the embodiments of the present invention, this information can be conceptionally used to include all of the CQI, RI and PMI values.

A size of UL control information (UCI) transmittable from a user equipment in a subframe depends on the number of SC-FDMA available for a control information transmission. The SC-FDMA available for the control information transmission means SC-FDMA symbols remaining after excluding SC-FDMA symbols for a reference signal transmission from the subframe. In case of an SRS (sounding reference signal) configured subframe, a last SC-FDMA symbol of the corresponding subframe is excluded. A reference signal is used for coherent detection of PUCCH. The PUCCH supports 7 formats in accordance with the transmitted information.

Table 1 shows a mapping relation between PUCCH format and UCI in LTE.

TABLE 1

| PUCCH format | UCI |
| --- | --- |
| Format 1 | Scheduling request (SR) |
| Format 1a | 1-bit HARQ ACK/NACK including or not including SR |
| Format 1b | 2-bit HARQ ACK/NACK including or not including SR |
| Format 2 | CQI(20 coded Bits) |
| Format 2 | 1-bit or 2-bit HARQ ACK/NACK for CQI and extended CP |
| Format 2a | CQI and 1-bit HARQ ACK/NACK |
| Format 2b | CQI and 2-bit HARQ ACK/NACK |

II. Related to LTE System

1. Multi-Carrier Environment

Communication environments taken into consideration by embodiments of the present invention include all multicarrier aggregation supportive environments. In particular, a multicarrier or CA (carrier aggregation) system used by the present invention means a system that uses at least one component carrier (CC) having a bandwidth smaller than a target band by aggregation in configuring a targeted broadband to support a broadband.

According to the present invention, multicarrier means aggregation of carriers (or carrier aggregation). In this case, the carrier aggregation means aggregation of non-contiguous carriers as well as aggregation of contiguous carriers. Moreover, the carrier aggregation may be interchangeably substituted with such a terminology as a bandwidth aggregation, a spectrum aggregation and the like.

In the multiple carriers (i.e., carrier aggregation) configured in a manner of combining at least two or more component carriers (CCs) together, the goal of the LTE-A system is to support bandwidths up to 100 MHz. When at least one or more carriers, each of which has a bandwidth smaller than a target band, are combined or aggregated, the bandwidth of the aggregated carrier may be limited to a bandwidth used by a legacy IMT system to secure backward compatibility with the legacy system.

For instance, a legacy 3GPP LTE system supports bandwidths of {1.4, 3, 5, 10, 15, 20}MHz and a 3GPP LTE-advanced (LTE-A) system may be configured to support a bandwidth greater than 20 MHz for compatibility with the legacy system using the above bandwidths only. Moreover, a multicarrier system used by the present invention may be configured to support carrier aggregation by defining a new bandwidth irrespective of bandwidths used by a legacy system.

LTE-A system uses the concept of a cell to manage radio resources. A cell is defined as a combination of a DL resource and a UL resource. Yet, the UL resource is not a necessary element. Hence, the cell may be configured with a DL resource only or both a DL resource and a UL resource. In case that multiple carriers (i.e., carrier aggregation) are supported, a linkage between a carrier frequency (or DL CC) of a DL resource and a carrier frequency (or UL CC) of a UL resource may be indicated by a system information.

Cells used by LTE-A system may include a primary cell (PCell) and a secondary cell (SCell). The PCell may mean a cell operating on a primary frequency (or primary CC) and the SCell may mean a cell operating on a secondary frequency (or secondary CC). yet, a single PCell is assigned to a specific user equipment only, while at least one SCell can be assigned.

The PCell is used to perform an initial connection establishment process or a connection reconfiguration process. The PCell may mean the cell indicated in a handover process. The SCell can be configured after completion of the establishment of RRC (radio resource control) connection and may be used to provide an additional radio resource.

PCell and SCell may be used as a serving cell. If a carrier aggregation is not configured for a user equipment in RRC_CONNECTED state or a user equipment does not support a carrier aggregation, there exists one serving cell configured with PCell only. On the other hand, if a carrier aggregation is configured for a user equipment in RRC_CONNECTED state, at least one serving cell can exist. And, PCell and at least one SCell are included in the whole serving cell.

After an initial security activating process has started, E-UTRAMN can configure a network including at least one SCell in addition to PCell configured in the early stage of a connection establishment process. In a multicarrier environment, PCell or SCell can work as a component carrier. Namely, the carrier aggregation can be understood as the aggregation of PCell and at least one SCell. In the following embodiments, a primary component carrier (PCC) may be usable as having the same meaning of PCell and a secondary component carrier (SCC) may be usable as having the same meaning of SCell.

2. MIMO (Multi-Input Multi-Output Feedback)

In a wireless access system supportive of multicarrier aggregation (CA) technology used by embodiments of the present invention, an MIMO feedback method using at least two input/output antennas can be supported as well.

MIMO feedback is configured with PMI (precoding matrix index), RI (rank indicator) and CQI (channel quality information) index. IN this case, the PMI indicates an index of a precoding matrix that configures a codebook. The RI is determined from the number of assigned transmission layers. And, a user equipment can acquire an RI value for the related DCI. The PMI is defined in 3GPP TS 36.211 specification. A user equipment measures SINR and can select an optimal PMI in consideration of the measured SINR. CQI indicates a quality of a channel. And, the CQI index indicates a channel coding rate and a modulation scheme.

FIG. 5 is a diagram for a configuration of a wireless communication system including multiple antennas.

Referring to FIG. 5 (a), if the number of transmitting antennas is incremented into $N_T$ and the number of receiving antennas is incremented into $N_R$, theoretical channel transmission capacity is increased in proportion to the number of antennas unlike the case that a transmitter or receiver uses a plurality of antennas. Hence, a transmission rate may be enhanced and frequency efficiency may be remarkably raised. The transmission rate according to the increase of the channel transmission capacity may be theoretically raised by an amount resulting from multiplying a maximum transmission rate $R_0$ of the case of using a single antenna by a rate increasing rate $R_i$.

$$R_i = \min(N_T, N_R) \qquad \text{[Formula 1]}$$

For instance, in an MIMO communication system, which uses 4 transmitting antennas and 4 receiving antennas, it may be able to obtain a transmission rate 4 times higher than that of a single antenna system. After this theoretical capacity increase of the MIMO system has been proved in the middle of 90's, many efforts are ongoing to be made to various techniques for drive it into substantial data rate improvement. Some of these techniques are already adopted as standards for various wireless communications such as 3G mobile communications, a next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. Assume that $N_T$ transmitting antennas and $N_R$ receiving antennas exist in this system.

First of all, a transmission signal is explained. If there are $N_T$ transmitting antennas, $N_T$ maximum transmittable informations exist. Hence, the transmission information may be represented as follows.

$$s = [s_1, s_2, \ldots, s_{N_T}]^T \qquad \text{[Formula 2]}$$

Meanwhile, transmission power can be set different for each transmission information $s_1, s_2, \ldots, s_{N_T}$. If the respective transmission powers are set to $P_1, P_2, \ldots, P_{N_T}$, the transmission power adjusted transmission information may be represented as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Formula 3]}$$

And, $\hat{S}$ may be represented as follows using a transmission power diagonal matrix P.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Formula 4]}$$

If a weight matrix W is applied to the transmission power adjusted transmission information vector $\hat{S}$, a case of configuring $N_T$ transmission signals $x_1, x_2, \ldots, x_{N_T}$ actually transmitted can be taken into consideration as follows. In this case, the weight matrix W plays a role in properly distributing each transmission information to each antenna according to a transmission channel status and the like. The $x_1, x_2, \ldots, x_{N_T}$ may be represented using a vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Formula 5]}$$

In Formula 5, $w_{ij}$ indicates a weight between an $i^{th}$ transmitting antenna and a $j^{th}$ information. And, W may be called a precoding matrix.

When $N_R$ receiving antennas exist, if reception signals of the receiving antennas are set to $y_1, y_2, \ldots, y_{N_R}$, a reception signal vector can be represented as follows.

$$y = [y_1, y_2, \ldots, y_{N_R}]^T \qquad \text{[Formula 6]}$$

If a channel is modeled in MIMO wireless communication system, the channel can be represented as an index of a transmitting antenna and an index of a receiving antenna. A channel between a transmitting antenna j and a receiving antenna i may be represented as $h_{ij}$. In the $h_{ij}$, it should be noted that a receiving antenna index is followed by a transmitting antenna index in order of index.

FIG. 5 (b) shows a channel to a receiving antenna i from each of $N_T$ transmitting antennas. These channels may be represented as a vector or matrix in a manner of tying the channels b together. Referring to FIG. 5 (b), the channels between the receiving antenna i and the $N_T$ transmitting antennas can be represented as follows.

$$h_i^T = [h_{i1}, h_{i2}, \ldots, h_{iN_T}] \quad \text{[Formula 7]}$$

Hence, all the channels arriving from $N_T$ transmitting antennas to $N_R$ relieving antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \quad \text{[Formula 8]}$$

In an actual channel, a transmission signal passes through a channel matrix H and then has AWGN (additive white Gaussian noise) added thereto. If white noses $n_1, n_2, \ldots, n_{N_R}$ respectively added to $N_R$ receiving antennas, the white noises $n_1, n_2, \ldots, n_{N_R}$ can be represented as follows.

$$n = [n_1, n_2, \ldots, n_{N_R}]^T \quad \text{[Formula 9]}$$

Hence, the reception signal vector may be expressed as follows through the above-mentioned formula modeling.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Formula 10]}$$

$$Hx + n$$

Meanwhile, the number of rows/columns of a channel matrix H indicating a channel state is dependent on the number of transmitting/receiving antennas. The number of rows in the channel matrix H is equal to the number $N_R$ of the receiving antennas. The number of columns in the channel matrix H is equal to the number $N_T$ of the transmitting antennas. In particular, the channel matrix H becomes $N_R \times N_T$ matrix.

A rank of matrix is defined as a minimum one of the number of independent rows and the number of independent columns. Hence, it may be impossible for a rank of matrix to become greater than the number of rows or columns. A rank (rank(H)) of a channel matrix H is restricted to the following.

$$\text{Rank}(H) \leq \min(N_T, N_R) \quad \text{[Formula 11]}$$

For another definition of a rank, when Eigen value decomposition is performed on a matrix, a rank may be defined as the number of Eigen values except 0. Similarly, for a further definition of a rank, when singular value decomposition is performed, a rank may be defined as the number of singular values except 0. Hence, the physical meaning of a rank in a channel matrix may be regarded as a maximum number for sending different informations on a given channel.

In the description of this disclosure, 'rank' for MIMO transmission indicates the number of paths for independently transmitting a signal in a specific time resource on a specific frequency resource, while 'the number of layers' indicates the number of signal streams transmitted via each path. Since a transmitting end generally transmits layers of which number corresponds to the number of ranks used for a signal transmission, a rank has the same meaning of the layer number unless mentioned specially.

3. Reference Signal (RS)

Since a data/signal is transmitted on a radio channel in a wireless communication system, the data/signal may be distorted on radio in the course of the transmission. In order for a receiving end to correctly receive the distorted signal, it is preferable that the signal received by being distorted is corrected using channel information. In order for a transmitting end and/or a receiving end to detect the channel information, it is able to use a reference signal (RS) known to both of the receiving end and the transmitting end. The reference signal may be called a pilot signal.

When a transmitting end transmits or receives data using MIMO antennas, in order for a receiving end to accurately receive the data, it is preferable that a channel state between a transmitting antenna and a receiving antenna is detected. In doing so, in order for the receiving end to detect the channel state, it is preferable that each transmitting antenna of the transmitting end has an individual reference signal.

Downlink reference signals may include a common reference signal (CRS) shared with all user equipments in a cell and a dedicated reference signal (DRS) for a specific user equipment only. Using these reference signals (CRS, DRS), information for demodulation and channel measurement can be provided by a transmitting end.

A receiving end (e.g., a user equipment) measures a channel state using CRS and can feed such an indicator related to a channel quality as a CQI (Channel Quality Indicator), a PMI (Precoding Matrix Index) and/or an RI (Rank Indicator) back to a transmitting end (e.g., a base station). In the embodiments of the present invention, the CRS may be called a cell-specific reference signal (RS). Yet, a reference signal related to a feedback of a channel state information can be defined as CSI-RS.

DRS can be transmitted on resource elements to user equipments if demodulation of data on PDSCH is necessary. A user equipment can receive information indicating a presence or non-presence of DRS by an upper layer signaling. The DRS is valid only if the corresponding PDSCH is mapped. In the embodiments of the present invention, the DRS may be called a UE-specific reference signal (RS) or a demodulation reference signal (DMRS).

FIG. 6 is a diagram to illustrate one example of a reference signal pattern mapped to a DL resource block (RB) pair defined in 3GPP LTE system.

A DL resource block (RB) pair, which is a unit for mapping a reference signal, may be configured with '1 subframe in time domain×12 subcarriers in frequency domain'. In particular, one resource block on a time axis (x-axis) may have a length of 14 OFDM symbols in case of a normal CP (cyclic prefix) [cf. FIG. 6 (a)] or a length of 12 OFDM symbols in case of an extended CP (cyclic prefix) [cf. FIG. 6 (b)].

Referring to FIG. 6, resource elements (REs) denoted by 0, 1, 2 and 3 in each resource block indicate resource elements to which CRSs for antenna port indexes 0, 1, 2 and 3 of a transmitting end (e.g., a base station) are mapped, respectively. And, resource elements denoted by 'D' mean DRS-mapped resource elements.

In the following description, CRS is explained in detail.

First of all, CRS is a reference signal receivable in common by all user equipments (UEs) in a cell and is distributed across a whole band. And, the CRS can be used to estimate a channel of a physical antenna. The CRS may be used for channel state information (CSI) and data demodulation.

The CRS may be defined in various forms in accordance with antenna configuration in a transmitting end (e.g., a base station). In 3GPP LTE (e.g., Rel-8/9) system, a transmitting end is able to support up to 4 transmitting antennas.

In case that MIMO antennas are supported, when reference signals are transmitted from at least one antenna port, a reference signal is carried on specific resource elements depending on a prescribed pattern. In doing so, a resource element carrying a reference signal for one antenna port does not carry a references signal for another antenna port. In particular, reference signals on different antennas do not overlap with each other.

A rule for mapping CRS to a resource block is defined as follows.

$$k = 6m + (v + v_{shift}) \bmod 6 \quad \text{[Formula 12]}$$

$$l = \begin{cases} 0, N_{symb}^{DL} - 3 & \text{if } p \in \{0, 1\} \\ 1, & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v_{shift} = N_{ID}^{cell} \bmod 6$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

In Formula 12, k indicates a subcarrier index, l indicates a symbol index, and p indicates an antenna port index. $N_{symb}^{DL}$ indicates the number of OFDM symbols in one downlink slot, $N_{RB}^{DL}$ indicates the number of radio resources allocated to downlink, $n_s$ indicates a slot index, and $N_{ID}^{cell}$ indicates a cell ID. Moreover, 'mod' means a modulo operation.

In the embodiments of the present invention, a position of a reference signal may vary in frequency domain depending on a value of $V_{shift}$. Since the $V_{shift}$ value depends on a cell ID, a position of a reference signal can have a different frequency shift value for each cell.

In particular, a position of CRS can be shifted in frequency domain in order to raise channel estimation performance through the CRS. For instance, if a reference signal is situated on every 3 subcarriers, reference signals in one cell are assigned to $3k^{th}$ subcarrier, while a reference signal in another cell is assigned to $(3k+1)^{th}$ subcarrier. In viewpoint of one antenna port, CRSs are arranged by 6-RE intervals in frequency domain and are preferably spaced apart from a reference signal assigned to another antenna port by 3-RE interval.

CRSs are arranged by constant intervals by starting from a symbol index 0 of each slot in time domain. A time interval is defined different in accordance with a cyclic prefix (CP) length. In case of a normal cyclic prefix, a reference signal is situated at symbol indexes 0 and 4 of a slot. In case of an extended cyclic prefix, a reference signal is situated at symbol indexes 0 and 3 of the slot. A reference signal for an antenna port having a maximum value in two antenna ports is defined within one OFDM symbol.

Hence, in case of 4-transmitting antenna transmission, CRS for antenna ports 0 and 1 is situated at symbol indexes 0 and 4 (or symbol indexes 0 and 3 in case of an extended CP) of each slot. And, CRS for antenna ports 2 and 3 is situated at symbol index 1 of the slot. Yet, positions of the CRS for the antenna ports 2 and 3 in frequency domain may be switched to each other in a second slot.

In the following description, DRS is explained in detail.

First of all, in LTE system, DRS is used to demodulate data. In MIMO antenna transmitting scheme, when a user equipment receives DRS, a precoding weight is coupled with a data channel signal transmitted from each transmitting antenna and is then used to estimate a corresponding channel.

The 3GPP LTE system (e.g., Release-8) supports maximum 4 transmitting antennas and defines DRS for rank 1 beamforming. The DRS for the rank 1 beamforming indicates a reference signal for antenna port index 5 as well.

A rule for mapping DRS to a resource block is defined as follows. Formula 13 shows a case of a normal cyclic prefix (CP), while Formula 14 shows a case of an extended cyclic prefix (CP).

$$k = (k') \bmod N_{sc}^{RB} + N_{sc}^{RB} \cdot n_{PRB} \quad \text{[Formula 13]}$$

$$k' = \begin{cases} 4m' + v_{shift} & \text{if } l \in \{2, 3\} \\ 4m' + (2 + v_{shift}) & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Formula 14]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Formula 13 and Formula 14, the k indicates a subcarrier index, the l indicates a symbol index, and the p indicates an antenna port. The $N_{SC}^{RB}$ indicates a resource block size in frequency domain and may be represented as the number of subcarriers. The $n_{PRB}$ indicates a physical resource block number. And, the $N_{RB}^{PDSCH}$ indicates a bandwidth of a resource block of a corresponding PDSCH transmission. The $n_s$ indicates a slot index and $N_{ID}^{cell}$ indicates a cell ID. Moreover, the 'mod' means a modulo operation. A position of a reference signal in frequency domain varies depending on a value of the $V_{shift}$. Since the $V_{shift}$ value depends on a cell ID, the position of the reference signal has one of various frequency shift values in accordance with a cell.

4. The General of CoMP (Coordinated Multi-Point)

In order to meet the LTE-A requirements, CoMP (coordinate multi-point) transmission scheme has been proposed. In this case, the CoMP may be named one of co-MIMO (collaborated MIMO), network MIMO and the like. The CoMP is the scheme devised to enhance an user equipment operation on a cell boundary and increase average throughput of each sector.

Generally, in a multi-cell environment having a frequency reuse factor set to 1, the performance and average sector throughput of the user equipment located at the cell boundary may be lowered due to inter-cell interference (ICI). In order to reduce the ICI and provide reasonable processing performance to user equipments on a cell boundary, simple technologies (e.g., FFR (fractional frequency reuse) in UE-specific power control, etc.) can be applied to LTE-A system. The use of the FFR is more effective in reducing ICI or reusing the ICI as a desired signal than reducing a use of a frequency resource per cell.

The CoMP schemes in DL can be classified into joint processing (JP) scheme and coordinated scheduling/coordinated beamforming (CS/CB) scheme. In case of the JP scheme, data can be transmitted in a CoMP collaborated set.

In case of the joint transmission, PDSCH signal is transmitted from a plurality of points (e.g., portion or all of the CoMP collaborated set) at a time. In particular, data is transmitted to a single user equipment from multiple transmission points to enhance a received signal quality and/or remove active interference on other user equipments. In case of the dynamic cell selection, a PDSCH signal is transmitted from one point (CoMP collaborated set) at a time.

In case of the CS/CB, although data is transmittable from a serving cell only, user scheduling/beamforming selection can be transmitted by coordination of cells corresponding to CoMP collaborated set.

The CoMP reception in UL means a reception of transmission signals coordinated at multiple points and geographically spaced transmission points and CoMP schemes can be discriminated by the joint reception (JR) and the CS/RS (coordinated scheduling/beamforming). In this case, in case of the JR, a transmitted PUSCH signal is received at multiple receiving points. In case of the CS/CB, a PUSCH signal is received at a single receiving point only but the scheduling/beamforming is determined by the cells coordinated in accordance with the CoMP collaborated set.

5. Sounding Reference Signal (SRS)

Sounding reference signal (SRS) is used for channel quality measurement in performing a frequency-selective scheduling and is not associated with UL data and/or control information transmission, by which the sounding reference signal is non-limited. And, the SRS may be usable for other purposes such as a purpose of an improved power control, a purpose of supporting various start-up functions of recently unscheduled user equipments.

The start-up functions of the user equipments may include a data modulation and coding scheme (MCS), an initial power control for data transmission, a timing advance and a frequency semi-selective scheduling. In this case, the frequency semi-selective scheduling means the scheduling performed in a manner of selectively assigning a frequency resource in a first slot of a subframe and assigning a frequency in a second slot in a manner of pseudo-randomly hopping into another frequency.

The SRS may be usable to measure a DL channel quality on the assumption that a radio channel is reciprocal between UL and DL. This assumption is particularly effective to a TDD (time division duplex) system in which a UL and a DL share the same frequency spectrum with each other by being separated from each other in time domain.

Subframes of SRS transmitted by a prescribed user equipment within a cell can be indicated by a cell-specific broadcast signal. A 4-bit cell-specific parameter 'srsSubframeConfiguration' indicates 15 kinds of available configurations of a subframe transmittable in each radio frame. Using these SRS configurations, SRS overhead can be flexibly adjusted. A $16^{th}$ configuration of SRS is to completely switch off an SRS within a cell and is suitable for a serving cell that mainly serves fast user equipments.

Figure 7:
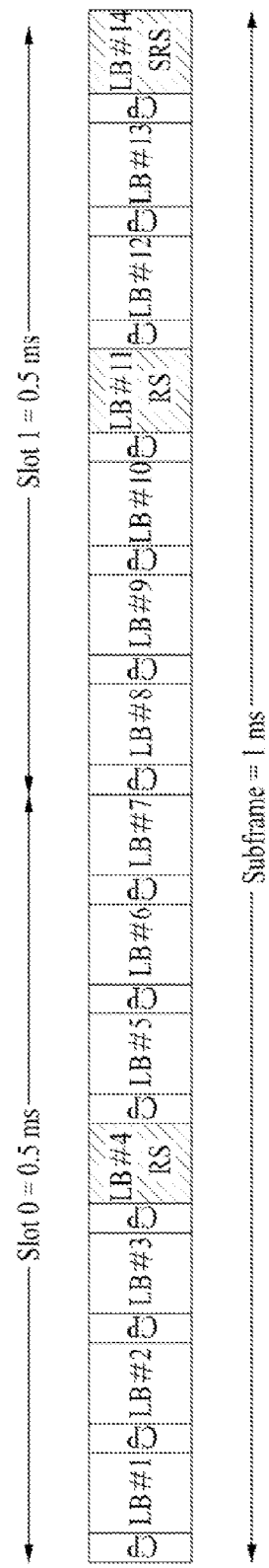
FIG. 7 is a diagram for one example of an uplink subframe including SRS symbols usable for the present invention.

FIG. 7 is a diagram for one example of an uplink subframe including SRS symbols usable for the present invention.

Referring to FIG. 7, SRS is always transmitted on a last SC-FDMA symbol of a configured subframe. Hence, SRS and DMRS (demodulation reference signal) are located at different SC-FDMA symbols, respectively. PUSCH data transmission is not allowed to be performed on SC-FDMA symbol designated to SRS transmission. Hence, if a sounding overhead is highest (i.e., a case that an SRS transmission symbol is included in every subframe), it does not exceed about 7%.

Each SRS symbol is generated for a given time unit and frequency band by a basic sequence (e.g., a random sequence, a set of ZC-based (Zadoff Chu-based) sequences) and every user equipment within a cell uses the same basic sequence. In doing so, SRS transmissions from a plurality of user equipments within a cell on the same frequency band can be identified from each other by becoming orthogonal to each other by different cyclic shifts of the basic sequence, respectively. Since a different basic sequence is assigned to each cell, an SRS sequence from a different cell may be identifiable. Yet, orthogonality between the different basic sequences are not guaranteed for SRS symbol.

6. Relay Node (RN)

A relay node forwards data transceived between a base station and a user equipment in two kinds of links (i.e., a backhaul link and an access link) differing from each other. The base station may include a donor cell. And, the relay node is connected by wireless to a wireless access network via the donor cell.

Meanwhile, regarding a use of a band (or spectrum) of a relay node, one case in which a backhaul link operates on the same frequency band of an access link may be referred to as 'in-band', and the other case in which a backhaul link operates on a frequency band different from that of an access link is referred to as 'out-band'. In both of the above-mentioned two cases of the in-band and the out-band, it is necessary for a user equipment (hereinafter named a legacy user equipment) operating in a legacy LTE system (e.g., Release-8) to access a donor cell.

Relay nodes may be classified into a transparent relay node and a non-transparent relay node depending on whether a user equipment recognizes the relay node. In particular, the 'transparent' may mean a case that a user equipment is unable to recognize whether the user equipment is communicating with a network through a relay node. And, the 'non-transparent' may mean a case that a user equipment is able to recognize whether the user equipment is communicating with a network through a relay node.

Regarding controls of a relay node, relay nodes may be classified into a first relay node configured as a part of a donor cell and a second relay node capable of controlling a cell by itself. Although the first relay node configured as a part of the donor cell may have a relay node identifier (relay ID), the corresponding relay node does not have a cell identity of its own. If at least one portion of RPM (Radio Resource Management) is controlled by a base station having the donor cell belong thereto, the first relay node may mean a relay node (RN) configured as a part of the donor cell despite that the rest of the RPM is located at the relay node. Preferably, this first relay node can support a legacy user equipment. For example, smart repeaters, decode-and-forward relays, L2 (second layer) relay nodes of various types, and a type-2 relay node may belong to the category of the first relay node.

The second relay node configured to self-control a cell controls one or more cells and a unique physical layer cell identity is provided to each cell controlled by the second relay node. And, each of the cells controlled by the second relay node can use the same RPM mechanism.

In aspect of a user equipment, there is no difference between accessing a cell controlled by the second relay node and accessing a cell controlled by a general base station. The cell controlled by the second relay node can support a legacy user equipment. For example, a self-backhauling relay node, an L3 (third layer) relay node, a type-1 relay node, and a type-1 a relay node may belong to the category of the second relay node.

The type-1 relay node plays a role as an in-band relay node in controlling a plurality of cells, and each of a plurality of the cells can be identified as a separate cell from a donor cell in aspect of a user equipment. Moreover, each of a plurality of the cells has a physical cell ID (defined in LTE Release-8) of its own and the type-1 relay node can transmit a synchronization channel of its own, a reference signal and the like.

In case of a single-cell operation, a user equipment may directly receive scheduling information and HARQ feedback from a type-1 relay node and can transmit its control channel (e.g., scheduling request (SR), CQI, ACK/NACK, etc.) to the type-1 relay node. Moreover, legacy user equipments (e.g., user equipments operating in LTE Release-8 system) may consider the type-1 relay node as a legacy base station (e.g., a base station operating in the LTE Release-8 system). In particular, the type-1 relay node has backward compatibility. Meanwhile, in aspect of user equipments operating in LTE-A system, the type-1 relay node is considered as a base station different from a legacy base station, whereby performance enhancement can be provided.

The type-1 a relay node operates in the out-band, and has the same features of the type-1 relay node mentioned in the foregoing description. Operation of the type-1 a relay node can be configured to minimize or eliminate the influence on L1 (first layer) operation.

The type-2 relay node (i.e., the first relay node) corresponds to an in-band relay node but has no separate physical cell ID not to form a new cell. The type-2 relay node is transparent to a legacy user equipment, and the legacy user equipment is unable to recognize a presence of the type-2 relay node. Although the type-2 relay node is able to transmit PDSCH, it does not transmit CRS and PDCCH at least.

Meanwhile, in order for a relay node to operate as in-band, prescribed resources in time-frequency space must be reserved for a backhaul link and these resources may be configured not be used for an access link. This configuration is called 'resource partitioning'.

The general principles of the resource partitioning in a relay node may be described as follows. First of all, a backhaul downlink and an access downlink may be multiplexed together on a single carrier frequency by Time Division Multiplexing (TDM) [i.e., either the backhaul downlink or the access downlink is activated in specific time.). Similarly, a backhaul uplink and an access uplink may be multiplexed together on a single carrier frequency by TDM [i.e., either the backhaul uplink or the access uplink can be activated in specific time).

Regarding the backhaul link multiplexing by FDD, a backhaul downlink transmission may be performed on a downlink frequency bend, and a backhaul uplink transmission may be performed on an uplink frequency band. Regarding the backhaul link multiplexing by TDD, a backhaul downlink transmission may be performed in a downlink subframe of a base station and a relay node, and a backhaul uplink transmission may be performed in an uplink subframe of the base station and the relay node.

In case of an in-band relay node, provided that both a backhaul downlink reception from a base station and an access downlink transmission to a user equipment are simultaneously performed on the same frequency band, a signal transmitted from a transmitting end of a relay node may cause signal interference to a receiving end of the relay node. In particular, signal interference or RF jamming may occur at an RF front-end of the relay node. Similarly, if both an access uplink reception from a user equipment and a backhaul uplink transmission to a base station are simultaneously performed on the same frequency band, signal interference may occur.

Therefore, it may be difficult for a relay node to implement the simultaneous transmission and reception on the same frequency band unless a sufficient separation between a received signal and a transmitted signal is provided [e.g., a transmitting antenna and a receiving antenna are installed in a manner of being sufficiently spaced apart from each other (e.g., installed on/under the ground)].

As a solution for the above signal interference problem, a relay node is enabled not to transmit a signal to a user equipment while receiving a signal from a donor cell. In particular, a gap is generated in a transmission from the relay node to the user equipment, and the user equipment (e.g., a legacy user equipment, etc.) may be configured not to expect any transmission from the relay node during this gap. This gap can be generated by configuring MBSFN (multicast broadcast single frequency network) subframe.

Figure 8:
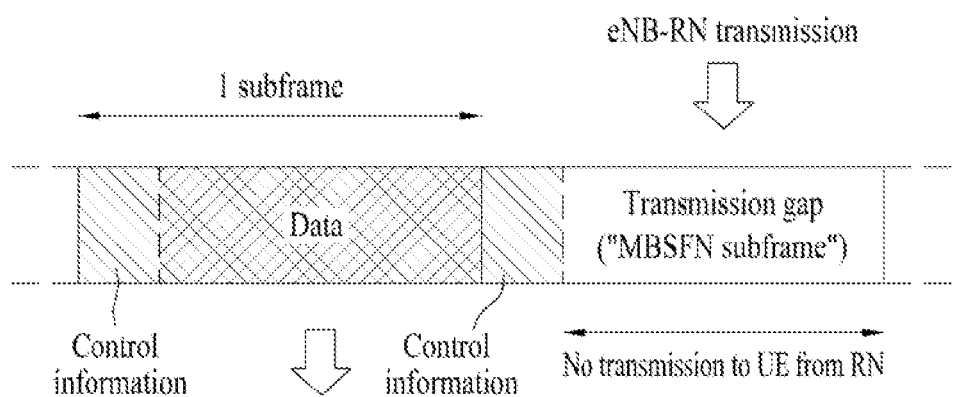
FIG. 8 is a diagram for one example of a relay node resource partitioning used by the present invention.

FIG. 8 is a diagram for one example of a relay node resource partitioning used by the present invention.

Referring to FIG. 8, in a first subframe that is a normal subframe, a downlink (i.e., an access downlink) control signal and data are transmitted from a relay node to a user equipment. In a second subframe that is an MBSFN subframe, while a control signal is transmitted from the relay node to the user equipment on a control region of a downlink subframe but any transmission from the relay node to the user equipment is not performed in the rest of regions of the downlink subframe.

In doing so, since a legacy user equipment expects a transmission of physical downlink control channel (PDCCH) in all downlink subframes (i.e., the relay node needs to support legacy user equipments within a coverage of the relay node to perform a measurement function thereof by receiving PDCCH in each subframe), it is necessary for the PDCCH to be transmitted in all the downlink subframes in order for each legacy user equipment to operate correctly.

Therefore, in a subframe (i.e., the second subframe) configured for a downlink (i.e., backhaul downlink) transmission from a base station to a relay node, the relay node needs to perform an access downlink transmission in first N OFDM symbols (N=1, 2 or 3) rather than to receive a backhaul downlink. For this, since PDCCH signal is transmitted from the relay node to the user equipment in a control region of the second subframe, it is able to provide backward compatibility with a legacy user equipment served by the relay node.

While no signal is transmitted to the user equipment in the rest of the region of the second subframe from the relay node, the relay node may receive a transmission from the base station. Therefore, the above-mentioned resource partitioning scheme can prevent the access downlink transmission and the backhaul downlink reception from being simultaneously performed by the in-band relay node.

The second subframe, which uses the MBSFN subframe, shall be described in detail as follows. First of all, a control region of the second subframe may be referred to as a relay node non-hearing interval. In particular, the relay node non-hearing interval may mean the interval in which a relay node transmits an access downlink signal instead of receiving a backhaul downlink signal.

As mentioned in the foregoing description, the relay node non-hearing interval may be configured to have 1-, 2- or 3-OFDM length. In the relay node non-hearing interval 1021, a relay node performs an access downlink transmission to a user equipment and may receive a backhaul downlink from a base station in the rest of the region. In doing so, since the relay node is unable to perform both transmission and reception on the same frequency band, it may take a time for the relay node to switch from a transmitting mode to a receiving mode.

Hence, it may be necessary to configure a guard time (GT) to enable the relay node to perform a transmitting/receiving mode switching in first partial interval of a backhaul downlink receiving region. Similarly, even if the relay node operates in a manner of receiving a backhaul downlink from the base station and transmitting and access downlink to the user equipment, it may be able to configure a guard time (GT) for the transmitting/receiving mode switching of the relay node.

The length of the guard time may be defined as a value in time domain. For example, the length of the GT may be defined as k time samples (Ts) (where, k≥1) or may be set to the length of at least one or more OFDM symbols. Alternatively, in case that relay node backhaul downlink subframes are contiguously configured or in accordance with a prescribed subframe timing alignment relation, the guard time of a last part of a subframe may be defined or may not be configured.

In order to maintain backward compatibility, this guard time may be defined only in a frequency region configured for a backhaul downlink subframe transmission This is because a legacy user equipment is not supportable if a guard time is configured in an access downlink interval. In the backhaul downlink receiving interval except the guard time, the relay node can receive a PDCCH signal and a PDSCH signal from the base station. In the meaning of a relay node dedicated physical channel, they may be represented as R-PDCCH (Relay-PDCCH) and R-PDSCH (Relay-PDSCH), respectively.

III. Channel State Information (CSI) Transmitting Method
1. Channel State Information (CSI)

In 3GPP LTE standards, there are two kinds of transmission schemes including Open-Loop MIMO operational without channel information and Closed-Loop MIMO reflecting channel information. A transmitting/receiving end performs a beamforming based on each channel information (e.g., CSI) to obtain a multiplexing gain of MIMO antenna in Closed-Loop MIMO. In order to obtain a DL CSI, a base station can command a user equipment (UE) to feed the DL CSI back by assigning PUCCH or PUSCH to the corresponding user equipment.

CSI can be mainly classified into three kinds of informations including a rank indicator (RI), a precoding matrix indicator (PMI) and a channel quality information (CQI).

The RI indicates a rank information of a corresponding channel and means the number of streams received by UE through the same frequency time resource. Since a value of the RI is dominantly determined by a long term fading of a specific channel, it is fed back to a base station from a UE with a term generally longer than that of the PMI or CQI. The PMI is a value that reflects spatial property of a channel. And, the PMI indicates a precoding index of a base station preferred by a UE with reference to such a metric as SINR and the like. The CQI is a value that indicates a strength of a corresponding channel. And, the CQI means a reception SINR obtainable when a base station normally uses PMI.

2. CSI (Channel State Information) Measurement Set

In the following description, a CSI measurement set used by the embodiments of the present invention is explained. In the present invention, the CSI measurement set means a set of frequency or time resources that can be assumed to have the same CSI property. A base station (i.e., eNB) informs a user equipment (UE) of a CSI measurement set. Subsequently, the user equipment measures and selects CSI (PMI/CQI/RI) suitable for receiving a signal from resources belonging to the same CSI measurement set and is then able to report the selected CSI.

A base station can configure and assign at least one CSI measurement set for a single user equipment. In this case, a resource simultaneously belonging to different CSI measurement sets among at least one or more CSI measurement sets has a different CSI property in general.

Figure 9:
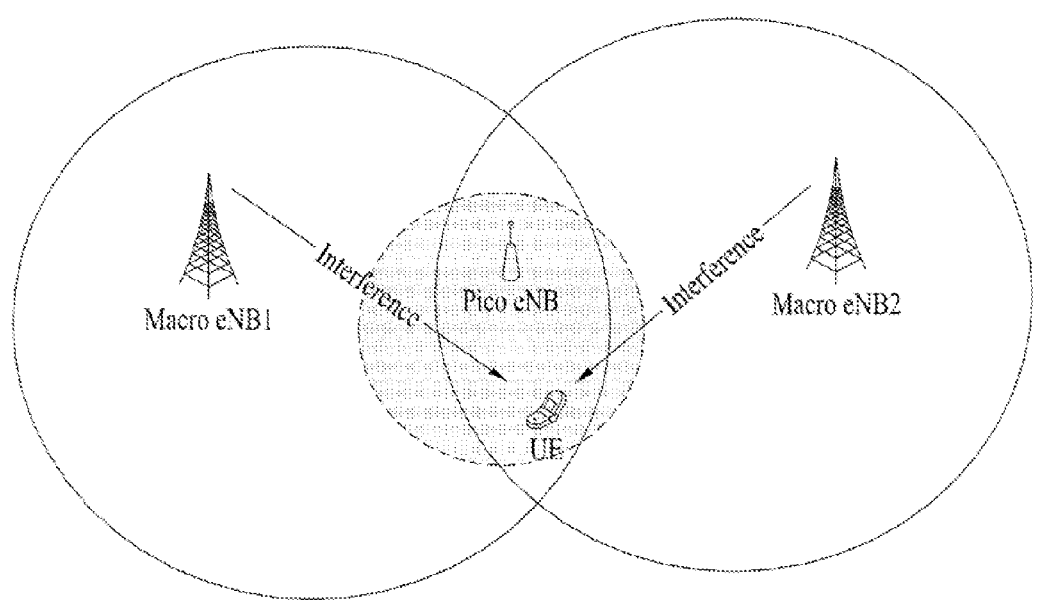
FIG. 9 is a diagram for an arranged relation between a pico cell and a macro cell usable for the present invention.

FIG. 9 is a diagram for an arranged relation between a pico cell and a macro cell usable for the present invention.

Referring to FIG. 9, in a situation that one pico cell receives interferences from two macro cells, each macro base station (macro eNB) can perform an ABS (almost blank subframe) operation of not transmitting a signal in some of all subframes to protect a signal transmission of the pico cell. In the embodiments of the present invention, a macro cell may include a general base station and a pico cell may include a relay node.

Figure 10:
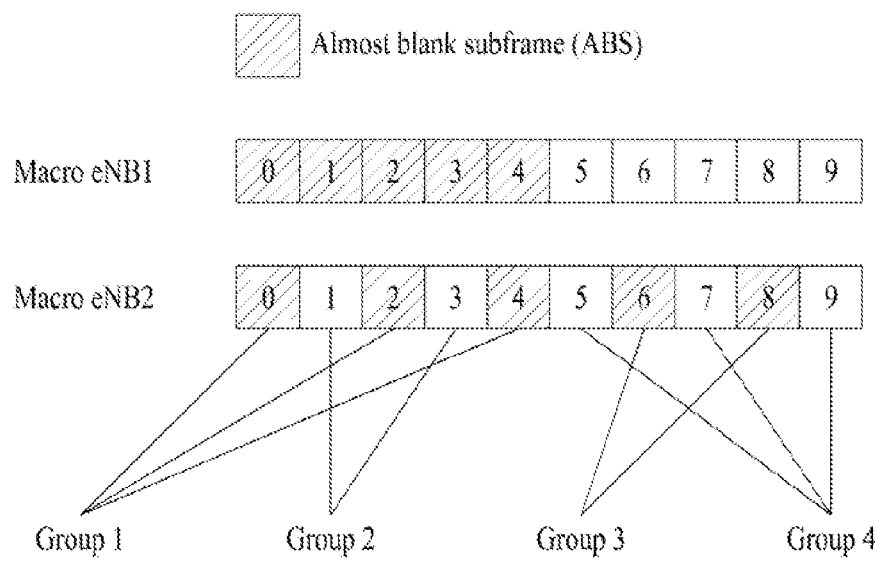
FIG. 10 is a diagram for one example of an almost blank subframe (ABS) usable for the present invention.

FIG. 10 is a diagram for one example of an almost blank subframe (ABS) usable for the present invention.

First of all, ABS shown in FIG. 10 is configured based on an arranged relation between the macro cell and the pico cell shown in FIG. 9. In this case, a size of interference caused to a user equipment connected to the pico base station (pico eNB) varies in each subframe depending on which macro base station performs an ABS operation.

In FIG. 10, all subframes may be classified into four kinds of resource groups depending on an ABS operation of a macro cell. In particular, a group 1 includes subframes in which both a macro base station (macro eNB1) and a macro base station (macro eNB2) perform ABS operations. A group 2 includes subframes in which the macro base station 1 (macro eNB1) performs the ABS operation only. A group 3 includes subframes in which the macro base station 2 (macro eNB2) performs the ABS operation only. And, a group 4 includes subframes in which both of the base stations perform general operations instead of the ABS operation.

In this case, since each of the resource groups is determined depending on whether each of the macro base stations performs the ABS operation, CSIs for the groups may differ from each other. Hence, the resource groups 1, 2, 3 and 4 may be usable as CSI measurement groups 1, 2, 3 and 4, respectively.

Referring to FIG. 9 and FIG. 10, if an APS operation is performed in a neighboring cell, a resource group having a specific user equipment receive interference of the same strength is generated. In this case, in order for the user equipment to perform signal transmission/reception and/or interference averaging on the same group only in CSI measurement, a base station can configure and assign a CSI averaging available CSI measurement set to the corresponding user equipment.

Ideally, the CSI measurement set can be configured for each of the four kinds of the resource groups shown in FIG. 10 and assigned to each user equipment. Yet, in order to restrict the number of CSI measurement sets managed by the user equipment, the base station can assign the CSI measurement set(s) of which number is smaller than that of the CSI measurement sets that can be managed by the user equipment. In particular, in order to prevent the problem that complexity of user equipment implementation increases excessively, such restriction can be put in a manner that maximum 2 CSI measurement sets are configured for one user equipment.

For instance, referring to FIG. 10, the resource group 1 and the resource group 2 can be configured as the CSI measurement sets for the corresponding user equipment. In this case, the user equipment measures CSI 1 and CSI2 for the CSI measurement set 1 and the CSI measurement set 2 by periods or by event triggering, respectively. If a request is made by the user equipment, the user equipment is able to report the corresponding CSI to the base station. In doing so, since the group 3 or the group 4 is not configured as a CSI measurement set, it is unnecessary for the user equipment to measure the CSI for the corresponding CSI measurement set. Yet, subframes next to the subframe 5 may not belong to any CSI measurement sets configured for the user equipment. If so, it may cause a problem that the user equipment is unable to report CSI to the base station.

3. CSI Reference Resource

In the following description, CSI reference resources available for the embodiments of the present invention are explained.

In case that a plurality of CSI measurement sets are assigned to a single user equipment, a base station should inform the user equipment that the user equipment should report CSI for a prescribed CSI measurement set at a specific timing point. For instance, if the base station transmits a CSI reporting request via a PDCCH signal as an aperiodic CSI reporting scheme, the user equipment can report CSI to the base station via an assigned PUSCH.

In doing so, the CSI, which is to be reported by the user equipment, can be determined depending on a CSI reference resource interworking with a subframe in which the CSI reporting request is transmitted. The CSI reference resource can be determined in a frequency domain, a time domain and/or a layer domain.

The CSI reference resource in the frequency domain can be determined by a group of DL physical resource blocks corresponding to a specific band related to a CQI value. The CSI reference resource in the time domain can be determined by a single DL subframe (n-n$_{CQI\_ref}$). And, the CSI reference resource in the layer domain can be determined by RI and/or PMI on the premise of CQI.

A single DL subframe in a time domain can be determined as a relation between a DL subframe (n) for receiving a CSI reporting request and a CSI reference resource (n-n$_{CQI\_ref}$). The single DL subframe (n-n$_{CQI\_ref}$) in the time domain can be configured as follows.

(1) In case of a periodic CSI reporting, the n$_{CQI\_ref}$ may be set to a smallest value equal to or greater than 4 to enable a CQI reference resource to correspond to a valid DL subframe.

(2) In case of an aperiodic CSI reporting, a CSI reference resource n$_{CQI\_ref}$ can be configured identical to a valid DL subframe corresponding to a CQI request in a corresponding DCI format.

(3) In case of an aperiodic CSI reporting, n$_{CQI\_ref}$ is set to 4 and it may become a DL subframe n-n$_{CQI\_ref}$ corresponding to a valid DL subframe. In this case, the DL subframe n-n$_{CQI\_ref}$ is a DL subframe received after a subframe corresponding to a CSI request of a random access response grant.

In the embodiments of the present invention, (1) a valid DL subframe is configured as a DL subframe for a corresponding user equipment, (2) the valid DL subframe is not an MBSFN subframe, (3) if a length of DwPTS field is equal to or smaller than 7680·TS, the valid DL subframe does not include the DwPTS field, and (4) the valid DL subframe should not be configured as a measurement gap for the corresponding user equipment. In case that a valid DL subframe for a CSI reference resource does not exist, a CSI reporting in a UL subframe n is omitted.

If a user equipment belongs to a CSI measurement set configured with CSI reference resources, an aperiodic CSI reporting of the user equipment can be performed without problems. For instance, assuming that all subframes are valid DL subframes in the FDD system shown in FIG. 10, the n-n$_{CQI\_ref}$ always becomes 4.

In doing so, if the user equipment makes a CSI reporting in a subframe 4, since a CSI reference resource becomes a subframe 0, the user equipment is able to report CSI 1 for a CSI measurement set 1 to a base station. And, if the user equipment makes a CSI reporting in a subframe 5, since a CSI reference resource becomes a subframe 1, the user equipment is able to report CSI 2 for a CSI measurement set 2 to the base station.

Yet, if a CSI reference resource does not belong to any CSI measurement sets configured for a user equipment, it may cause a problem that the corresponding user equipment has no CSI to report to a base station. For instance, referring to FIG. 10, in case that a user equipment is instructed to make an aperiodic CSI reporting in a subframe 9 (i.e., n=9), a CSI reference source becomes a subframe 5. Since the subframe 5 belongs to a CSI measurement set 4 (i.e., group 4) but does not belong to a CSI measurement set 1 or a CSI measurement set 2, it causes a problem that the user equipment is unable to make a report of CSI for the subframe to a base station.

4. Aperiodic CSI Reporting Method 1

In the present invention, in order to solve the above problem, even if a user equipment is instructed to make an aperiodic CSI reporting, if a CSI reference resource does not belong to any one of CSI measurement sets configured and assigned to the corresponding user equipment, the user equipment searches subframes previous to the CSI reference resource for a closest subframe belonging to a random CSI measurement set (particularly, in doing so, invalid subframes can be excluded for the restriction to valid subframes only) and is then able to report a CSI of the CSI measurement set, to which the found subframe belongings, to a base station.

Figure 11:
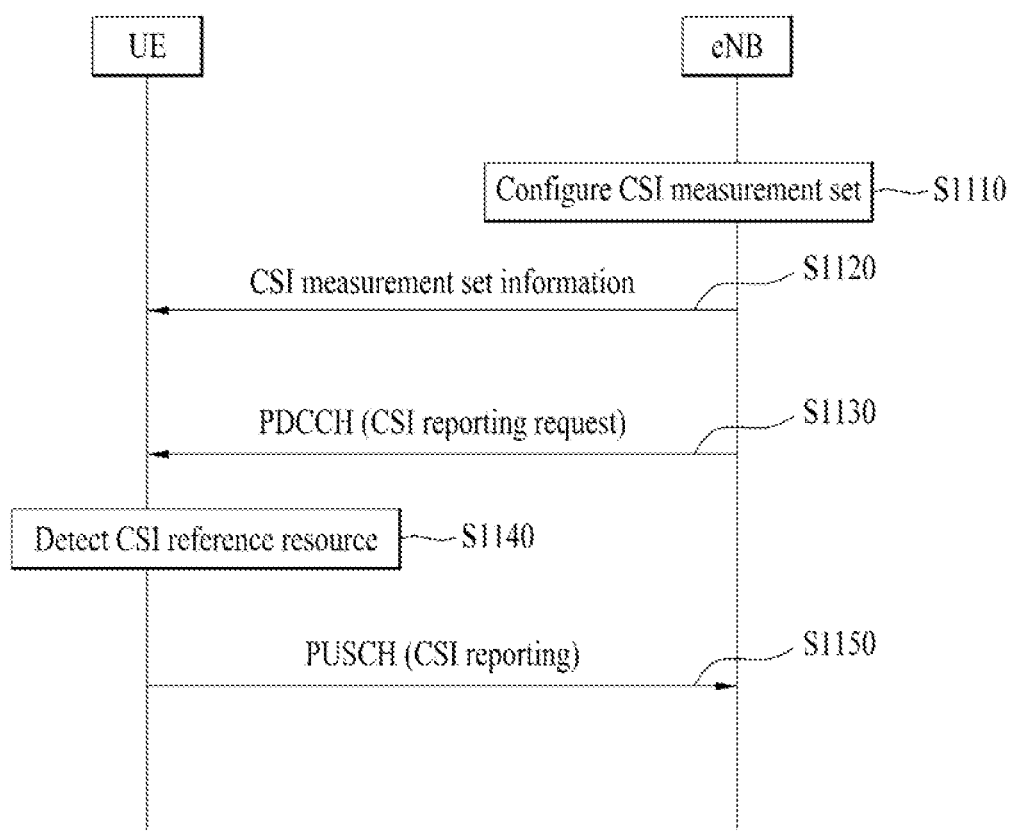
FIG. 11 is a diagram to illustrate one of aperiodic CSI reporting methods according to an embodiment of the present invention.

FIG. 11 is a diagram to illustrate one of aperiodic CSI reporting methods according to an embodiment of the present invention.

Referring to FIG. 11, a base station (eNB) can configure and assign a CSI measurement set to each user equipment (UE) [S1110].

The base station can transmit CSI measurement set information on at least one CSI measurement set assigned to the user equipment to the user equipment by upper layer signaling (e.g., RRC signaling) [S1120].

Subsequently, the base station can instruct the user equipment to make a CSI reporting by sending a PDCCH signal containing a CSI reporting request field to the user equipment [S1130].

In response to the CSI reporting request from the base station, the user equipment detects a CSI reference resource [S1140] and is then able to report a CSI corresponding to the detected CSI reference resource to the base station via a PUSCH signal [S1150].

The step S1140 is described in detail with reference to FIG. 10 as follows. First of all, if the user equipment receives a PDCCH signal for requesting an aperiodic report in a subframe 9, the CSI reference resource becomes a subframe 9 [cf. 3. CSI Reference Resource]. Yet, assuming that the at least one or more CSI measurement sets assigned to the user equipment include a resource group 1 and a resource group 2 in the step S1120, since the subframe 5 belongs to a resource group 4, the subframe 5 does not correspond to the CSI measurement set assigned to the user equipment.

In this case, the user equipment can reconfigure a CSI reference resource with a subframe, which is closest to a previous CSI reference resource among subframes in a random CSI measurement set previously appearing. Hence, since the subframe closest to the previous CSI reference resource among the subframes in the CSI measurement set is a subframe 4 belonging to the CSI measurement set 1 (i.e., the resource group 1), the user equipment can report CSI 1 corresponding to the subframe 4 to the base station.

Figure 12:
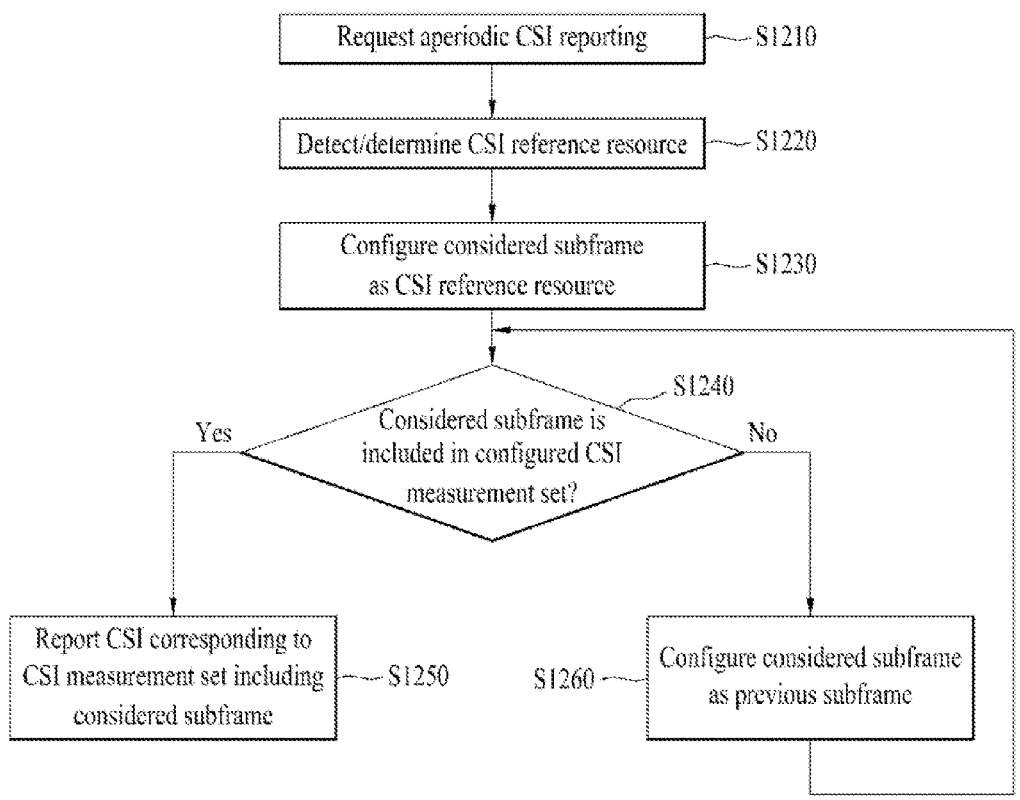
FIG. 12 is a diagram to illustrate one of CSI reference resource detecting methods applicable to embodiments of the present invention.

FIG. 12 is a diagram to illustrate one of CSI reference resource detecting methods applicable to embodiments of the present invention.

In particular, FIG. 12 shows one of the methods of detecting the CSI reference resource in the step S1140 shown in FIG. 11. First of all, a user equipment receives an aperiodic CSI reporting request in a specific subframe (e.g., a first subframe) via a PDCCH signal from a base station [S1210].

Subsequently, the user equipment can detect and determine a CSI reference resource using a specific subframe [S1220].

The user equipment is able to set a subframe (e.g., a second subframe), which is considered as a CSI reference resource based on the CSI reference resource determining method explained in the description of sections '2. CSI Measurement Set' and '3. CSI Reference Resource' in the step S1220, as the CSI reference resource [S1230].

The user equipment determines whether the considered subframe is included in the CSI measurement set configured and assigned to the user equipment [S1240].

If the considered subframe is included in the CSI measurement set that has been assigned to the user equipment, the user equipment can report CSI corresponding to the CSI measurement set to the base station via a PUSCH signal [S1250].

If the considered subframe is not included in the CSI measurement set that has been assigned to the user equipment, the user equipment can set the considered subframe as a previous subframe (e.g., a third subframe). Hence, the user equipment is able to reset the subframe (e.g., the third subframe), which is closest to the CSI reference resource detected by the user equipment among the previous subframes, as a CSI reference resource [S1260].

Figure 13:
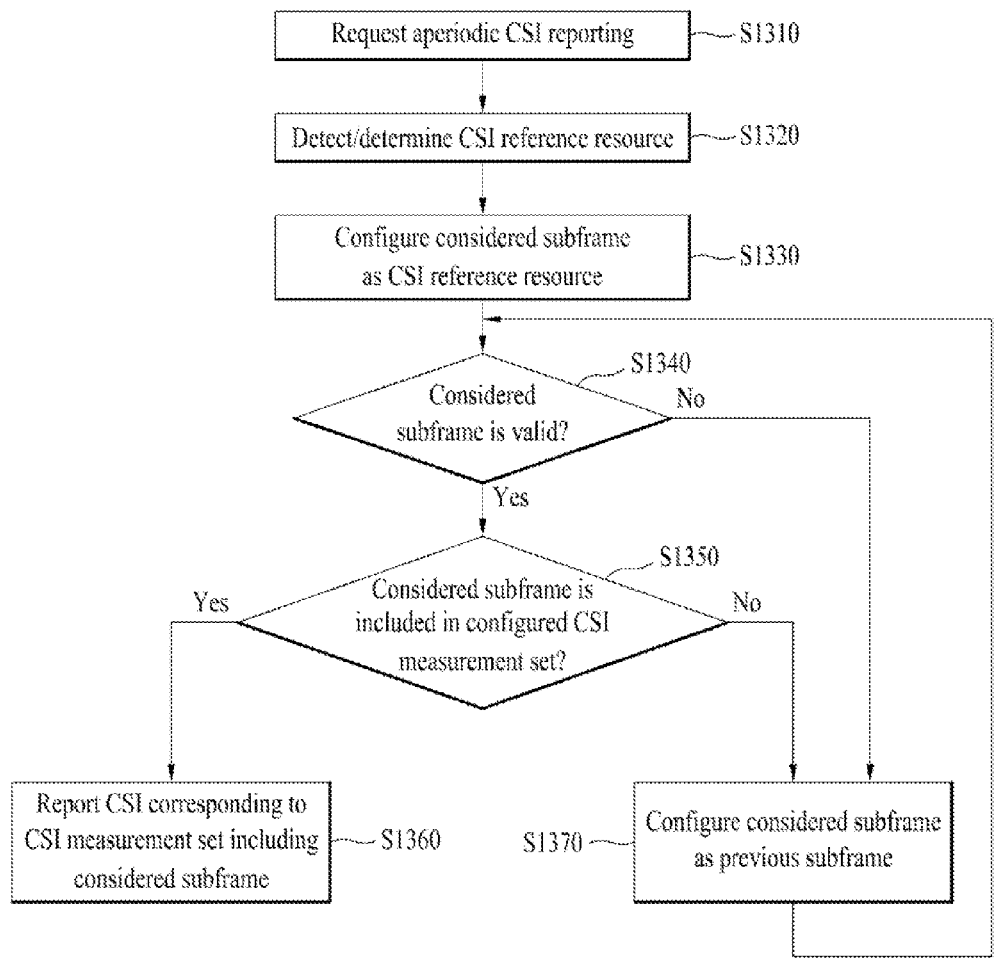
FIG. 13 is a diagram to illustrate another one of CSI reference resource detecting methods usable for embodiments of the present invention.

FIG. 13 is a diagram to illustrate another one of CSI reference resource detecting methods usable for embodiments of the present invention.

In particular, FIG. 13 shows one of the methods of detecting the CSI reference resource in the step S1140 shown in FIG. 11, and more particularly, a method of restricting a subframe previous to a CSI reference signal to a valid subframe.

First of all, a user equipment receives an aperiodic CSI reporting request in a specific subframe (e.g., a first subframe) via a PDCCH signal from a base station [S1310].

Subsequently, the user equipment can detect and determine a CSI reference resource using information on the specific subframe [S1320].

The user equipment is able to set a subframe (e.g., a second subframe), which is considered as a CSI reference resource based on the CSI reference resource determining method explained in the description of sections '2. CSI Measurement Set' and '3. CSI Reference Resource' in the step S1320, as the CSI reference resource [S1330].

The user equipment can determine whether the considered subframe is a valid subframe [S1340].

If the considered subframe is the valid subframe in the step S1340, the user equipment determines whether the considered subframe is included in the CSI measurement set configured and assigned to the user equipment [S1350].

If the considered subframe is not the valid subframe in the step S1340, the user equipment is able to reset a subframe (e.g., a third subframe), which is closest to the CSI reference resource detected by the user equipment among the previous subframes, as a CSI reference resource [S1370].

If the considered subframe is included in the CSI measurement set assigned to the user equipment in the step S1350, the user equipment can report CSI corresponding to the CSI measurement set to the base station via a PUSCH signal [S1360].

Yet, if the considered subframe is not included in the CSI measurement set assigned to the user equipment in the step S1350, the user equipment can set the considered subframe as a previous subframe. Hence, the user equipment is able to reset the subframe (e.g., the third subframe), which is closest to the CSI reference resource detected by the user equipment among the previous subframes, as a CSI reference resource [S1370].

In the step S1260 or the step S1370, the operation for the user equipment to restrict the subframe prior to the previous CSI reference resource to the valid subframe is identical to an operation for the user equipment to regard a subframe not belonging to any CSI measurement sets as invalid. To this end, the valid DL subframe explained in the description of sections '2. CSI Measurement Set' and '3. CSI Reference Resource' can be reconfigured as follows.

First of all, (1) a valid DL subframe is configured as a DL subframe for a corresponding user equipment, (2) the valid DL subframe is not an MBSFN subframe, (3) if a length of DwPTS field is equal to or smaller than $7680 \cdot T_S$, the valid DL subframe does not include the DwPTS field, (4) the valid DL subframe should not be configured as a measurement gap for the corresponding user equipment, and (5) the valid DL subframe should be included in a CSI measurement set for the corresponding user equipment.

The CSI reference resource detecting method described with reference to FIG. 12 or FIG. 13 can be used for the step S1140 shown in FIG. 11. Moreover, in the embodiments of the present invention, the CSI reference resource may be called a CQI reference resource.

The aperiodic CSI reporting methods are mainly described with reference to FIGS. 11 to 13. Yet, the methods described with reference to FIGS. 11 to 13 can be applied to periodic CSI reporting methods as well. In this case, a valid DL subframe should meet the following conditions. First of all, (1) the valid DL subframe is configured as a DL subframe for a corresponding user equipment, (2) the valid DL subframe is not an MBSFN subframe, (3) if a length of DwPTS field is equal to or smaller than $7680 \cdot T_S$, the valid DL subframe does not include the DwPTS field, (4) the valid DL subframe should not be configured as a measurement gap for the corresponding user equipment, and (5) if CSI measurement sets (i.e., CSI subframe sets) are assigned to the user equipment, the DL subframe should be included in CSI measurement sets associated with an periodic CSI reporting.

5. Aperiodic CSI Reporting Method 2

In the following description, a new CSI request field included in a PDCCH signal is defined to support an aperiodic CSI reporting method according to another embodiment of the present invention. The new CSI request field is configured in a manner of adding 1 bit to a previous CSI request field. And, the new CSI request field is used to directly instruct a user equipment to report a CSI corresponding to a prescribed CSI measurement set.

In 3GPP LTE system, a 1-bit CSI request field indicating a presence or non-presence of an aperiodic CSI reporting request exists in a PDCCH signal for granting a PUSCH transmission of a user equipment (UE). In particular, in the present invention, by adding 1 bit to a previous CSI request field, a base station can explicitly indicate a CSI to be reported by a user equipment.

Table 2 shows one example of a new CSI request field.

TABLE 2

| CSI request field value | Contents |
| --- | --- |
| 00 | No CSI reporting |
| 01 | CSI reporting for the CSI measurement set 1 |
| 10 | CSI reporting for the CSI measurement set 2 |
| 11 | CSI reporting for the CSI measurement set 1 and the CSI measurement set 2 |

In the embodiments of the present invention, contents of states '01', '10' and '11' of a new CSI request field are defined as Table 2. Table 2 shows one example only. And, a CSI measurement set indicated by states of a new CSI request field can be modified in accordance with a state of a CSI measurement set assigned to each user equipment by a base station.

Figure 14:
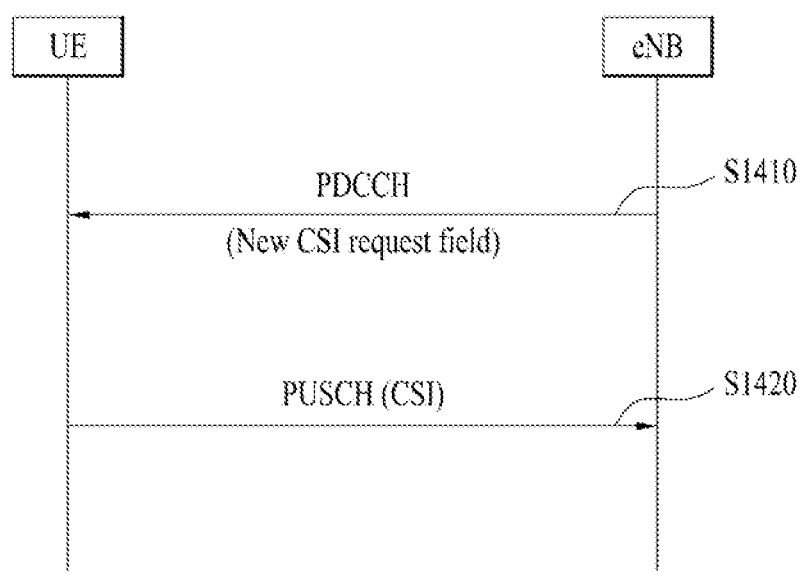
FIG. 14 is a diagram to illustrate another example of an aperiodic CSI reporting method according to an embodiment of the present invention.

FIG. 14 is a diagram to illustrate another example of an aperiodic CSI reporting method according to an embodiment of the present invention.

First of all, a base station can send a PDCCH signal including a new CSI request field described in Table 2 to a user equipment to request the user equipment to report a CSI [S1410].

Based on the CSI request field received in the step S1410, the user equipment can report a CSI for a CSI measurement set indicated by the base station to the base station via PUSCH. For instance, if the new CSI request field is set to '00', the user equipment does not report the CSI to the base station. If the new CSI request field is set to '01', the user equipment reports the CSI for a CSI measurement set 1 to the base station. If the new CSI request field is set to '11', the user equipment reports the CSI for a CSI measurement set 1 and the CSI for a CSI measurement set 2 to the base station [S1420].

6. Aperiodic CSI Reporting Method 3

Figure 15:
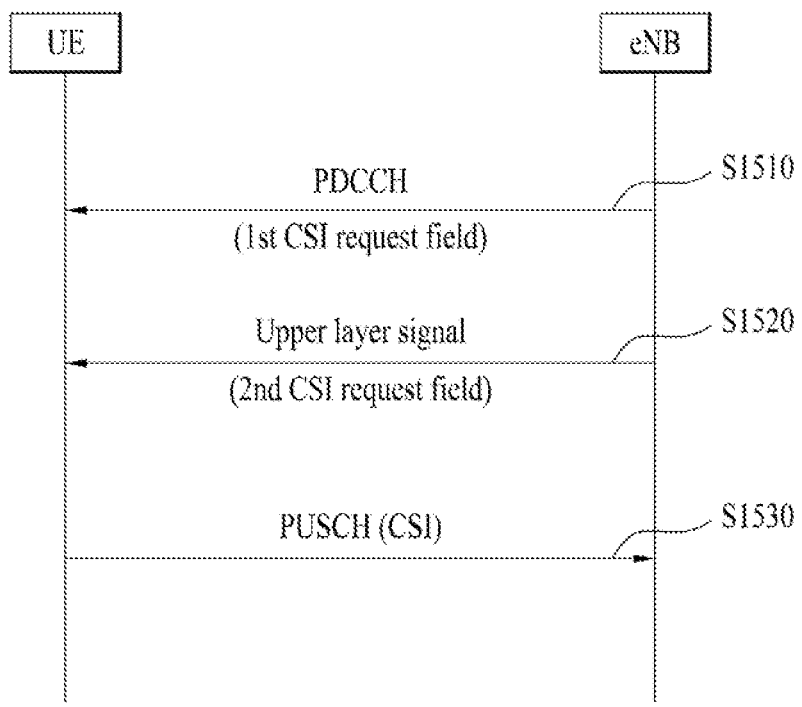
FIG. 15 is a diagram to illustrate a further example of an aperiodic CSI reporting method according to an embodiment of the present invention.

FIG. 15 is a diagram to illustrate a further example of an aperiodic CSI reporting method according to an embodiment of the present invention.

FIG. 15 has no difference from FIG. 14 in using the new CSI request field shown in Table 2. Yet, FIG. 15 differs from FIG. 14 in transmitting some or all of the states shown in Table 2 by such an upper layer signaling as an RRC signaling. Hence, in the following description, a new CSI request field transmitted via a PDCCH signal shall be named a first CSI request field and a new CSI request field transmitted by an upper layer signaling shall be named a second CSI request field.

In this case, a state '00' of a new CSI request field follows the first CSI request field. Yet, the rest of states '01', '10' and '11' can follow the second CSI request field transmitted via an upper layer signal. This is one example only. Information indicating what state will follow the second CSI request field can be indicated by an upper layer signaling. In particular, the interpretation of the second CSI request field delivered via an upper layer signal can include such an interpretation as 'reporting CSI of a specific subframe set', 'reporting CIS of all subframe sets' and the like.

Referring to FIG. 15, a base station can send a PDCCH signal including a first CSI request field to a user equipment in order to request the user to report CSI [S1510].

And, the base station can send an upper layer signal including a second CSI request field to the user equipment in order to request the user equipment to report CSI [S1520].

The user equipment can report a CSI, which corresponds to a CSI measurement set directly indicated by the base station, to the base station via a PUSCH signal by combining the $1^{st}$ CSI request field and the second CSI request field with each other [S1530].

In this case, if an interpretation for the CSI indicated by each state of the $1^{st}$ CSI request field and the second CSI request field is reconfigured by an newly transmitted upper layer signal, it may generate an interval in which the definition of applying a new interpretation to a prescribed timing point is not clearly set between the base station and the user equipment. In order to stably perform an aperiodic CSI reporting method in this interval, it may be able to apply an interpretation independent from that of an upper layer signal to some state(s).

For instance, the state '01' of the new CSI request field shown in Table 2 can be set to 'reporting a CSI for a CSI measurement set including a CSI reference resource'. In this case, since an interpretation of the state '01' has nothing to do with an upper layer signaling (e.g., an RRC signaling), the base station can trigger CSI reporting of a specific subframe via the corresponding state at least.

If it is unable to add 1 bit to PDCCH in a common search space, the corresponding state can be interpreted as 'reporting a CSI for a CSI measurement set including a CSI reference resource' in a manner similar to the case of setting the CSI request field for requesting the CSI reporting to '1'.

In FIG. 15, the base station and the user equipment can use the first CSI request field and the second CSI request field in a manner different from that of the above-described method. For instance, the base station requests a CSI reporting by sending the first CSI request field to the user equipment via PDCCH signal. In doing so, if the base station intends to change the CS measurement set assigned to the user equipment, the base station can send an upper layer signal including the second CSI request field indicating a new CSI measurement set to the user equipment. Using this, the base station can instruct the user equipment to report a CSI for the CSI measurement set different from that of the first CSI request field.

In particular, in the step S1510, based on the first CSI request field received, the user equipment can report the CSI for the CSI measurement set indicated by the base station to the base station via PUSCH. Yet, if the base station requests a CSI for a CSI measurement set different from the former CSI measurement set indicated in the step S1510, the base station can send an upper layer signal including the second CSI request field to the user equipment in the step S1520.

Therefore, in the step S1530, the user equipment can send a PUSCH signal including the CSI for the CSI measurement set indicated by the second CSI request field to the base station despite the first CSI request field.

7. Restriction Put on Aperiodic CSI Reporting Method Depending on Search Space

In the embodiments of the present invention described with reference to FIG. 14 and FIG. 15, the new CSI request field shown in Table 2 can be restricted to be applied to a UE-specific search space (USS) of PDCCH only. This is because, since a user equipment should detect and decode PDCCH (e.g., PDCCH masked with SI-RNTI indicating a transmitted location of SIB) of a predetermined length in a common search space (CSS), adding 1 bit to a DCI payload of a PDCCH signal for a specific usage results in increasing a BD (blind decoding) count of the user equipment.

Therefore, in case of the common search space, it is preferable that a CSI request field of a UL grant included in PDCCH uses a previous CSI request field of a 1-bit field as it is. In doing so, when a base station triggers an aperiodic CSI reporting request to a user equipment via the common search space, if a CSI measurement set is already configured for the corresponding user equipment, a PDCCH signal for triggering an aperiodic CSI reporting may be interpreted as follows.

First of all, if a CSI request field is set to 1, the user equipment can report a CSI for a subframe set configured for the restricted RLM/RRM to the base station. Alternatively, the user equipment is able to report a CSI for a CSI measurement set including the subframe set configured for the restricted RLM/RRM to the base station.

This is attributed to the following reason. First of all, in a dominant interference situation, the user equipment needs to restrict RLM/RRM process for such an operation as a cell selection, a handover and the like as well as a CSI measurement to specific resources. Yet, if there is only one state for an aperiodic CSI reporting, it may be effective to report a CSI for a subframe for RLM/RRM expected to have a highest scheduling frequency.

For the independence from RLM/RRM measurement configuration, a user equipment can report a CSI for a default measurement set to a base station. For instance, if a CSI request field is set to 1, the user equipment can report a CSI for a default measurement set to the base station. In doing so, if the default measurement set is set to a CSI measurement set 1, the user equipment can report a CSI for the CSI measurement set 1 to the base station.

The above-described embodiments of the present invention have a common point that all user equipments report CSI based on channel information measured in a subframe previous to an aperiodic CSI reporting requested subframe. In particular, regarding this operation, a base station intermittently sends CSI-RS for estimating a serving cell channel and a user equipment stores channel information estimated through the CSI-RS. If an appropriate CSI reporting instance occurs, the user equipment can calculate and report CSI based on the stored channel information.

In this case, since interference from another base station is not dependent on measurement of such a direct reference signal as CSI-RS, measurement reliability is generally lowered. Hence, the measurement can be interpolated across several subframes by more stable channel estimation. Due to this reason, the above-described embodiments of the present invention can be restricted to be applied only to a transmission mode operating on the basis of CSI-RS.

Figure 16:
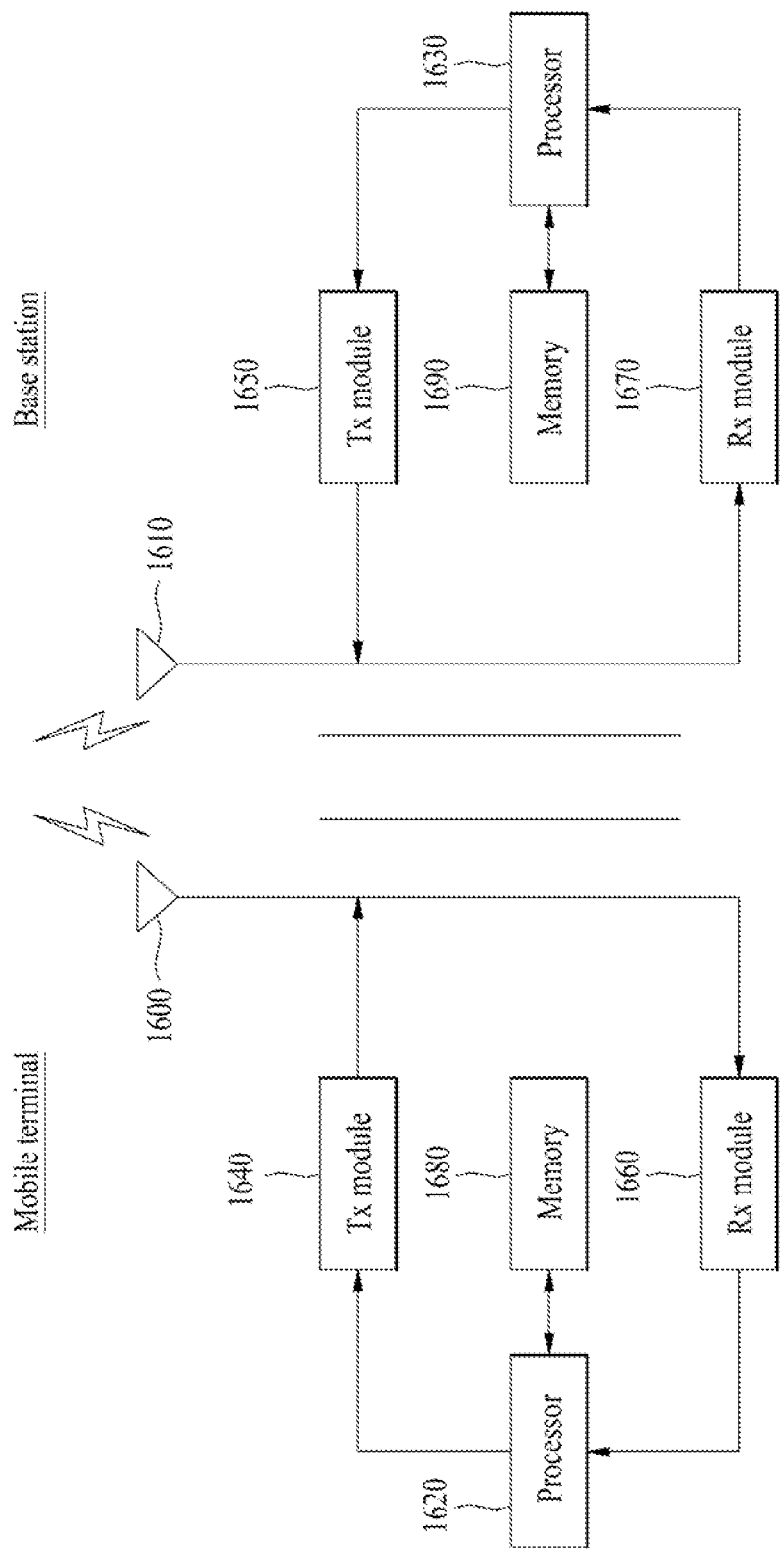
FIG. 16 is a diagram of a user equipment (UE) and a base station (eNB) for implementing the embodiments of the present invention described with reference to FIGS. 1 to 15 according to another embodiment of the present invention.

FIG. 16 is a diagram of a user equipment (UE) and a base station (eNB) for implementing the embodiments of the present invention described with reference to FIGS. 1 to 15 according to another embodiment of the present invention.

First of all, a user equipment operates as a transmitter in uplink or can operate as a receiver in downlink. A base station operates as a receiver in uplink or can operate as a transmitter in downlink.

In particular, the user equipment can include a transmitting module (Tx module) 1640 and a receiving module (Rx module) 1660 to control transmission and reception of information, data and/or message. The base station can include a transmitting module (Tx module) 1650 and a receiving module (Rx module) 1670 to control transmission and reception of information, data and/or message. The user equipment and the base station can include antennas 1600 and 1610 to receive information, data and/or messages, respectively. Moreover, the user equipment and the base station can include processors 1620 and 1630 for performing embodiments of the present invention and memories 1680 and 1690 for storing processing procedures of the processors temporarily or permanently, respectively. Moreover, each of the user equipment and the base station shown in FIG. 16 can further include at least one of an LTE module configured to support LTE system and LTE-A system and a low power RF/IF (radio frequency/intermediate frequency) module.

The transmitting and receiving modules included in each of the user equipment and the base station can perform a packet modulation/demodulation function for data transmission, a fast packet channel coding function, an OFDMA (orthogonal frequency division multiple access) packet scheduling function, a TTD (time division duplex) packet scheduling function and/or a channel multiplexing function.

The devices described with reference to FIG. 16 are the means for implementing the methods described with reference to FIGS. 1 to 15. Therefore, it is able to implement the embodiments of the present invention using the aforesaid components and functions of the user equipment and the base station.

For instance, the processor of the user equipment can receive an upper layer signaling including CSI measurement set information on a CSI measurement set transmitted by the base station and/or a PDCCH signal for requesting a CSI reporting using the receiving module including the RF module. The processor of the user equipment detects a CSI reference resource by referring to a DL subframe in which the PDCCH signal is received. The processor of the user equipment determines whether the CSI reference resource is included in the CSI measurement set. And, the processor of the user equipment can report a CSI corresponding to the CSI reference resource to the base station using the transmitting module [cf. FIGS. 11 to 13].

In the embodiments of the present invention, a new CSI request field is defined. And, a user equipment can report a CSI corresponding to a CSI measurement set indicated by the new CSI request field to a base station [cf. FIG. 14 and FIG. 15].

Meanwhile, in the present invention, a mobile station can include one of a personal digital assistant (PDA), a cellular phone, a personal communication service (PCS) phone, a GSM (global system for mobile) phone, a WCDMA (wideband CDMA) phone, an MBS (mobile broadband system) phone, a hand-held PC, a notebook PC, a smart phone, a MM-MB (multimode-multiband) terminal and the like.

In this case, the smart phone is a terminal provided with advantages of a mobile communication terminal and a PDA. The smart phone may mean a terminal in which a schedule management function of a PDA, data communication functions of fax transmission/reception, internet access, etc. are integrated on a mobile communication terminal. And, the multimode-multiband terminal means a terminal having a built-in multi-MODEM chip to be operable in a portable internet system and other mobile communication systems (e.g., CDMA (code division multiple access) 2000 system, WCDMA (wideband CDMA) system, etc.).

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in the memory unit 1680/1690 and is then drivable by the processor 1620/1630. The memory unit is provided within or outside the processor to exchange data with the processor through the various well-known means.

While the present invention has been described and illustrated herein with reference to the preferred embodiments thereof it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

The embodiments of the present invention are applicable to various kinds of wireless access systems. For example, the various kinds of the wireless access systems may include 3GPP ($3^{rd}$ Generation Partnership Project) LTE system, 3GPP LTE-A system, 3GPP2 and/or IEEE 802.xx (Institute of Electrical and Electronic Engineers 802.xx) system and the like. The embodiments of the present invention are applicable to all of the wireless access system applied technical fields as well as to the various kinds of the wireless access systems.

What is claimed is:

1. A method for aperiodic channel status information (CSI) reporting in a wireless access system, the method performed by a user equipment (UE) and comprising:
    receiving a radio resource control (RRC) message configuring two or more CSI measurement sets, wherein each of the two or more CSI measurement sets includes one or more subframes;
    receiving a physical downlink control channel (PDCCH) including a CSI request field triggering the aperiodic CSI reporting for one of the two or more CSI measurement sets; and
    reporting CSI on a subframe 'n',
    wherein the CSI is related to a subframe 'n-$n_{CQI\_ref}$',
    wherein 'n-$n_{CQI\_ref}$' is a smallest value greater than or equal to a predetermined value such that the subframe 'n-$n_{CQI\_ref}$' corresponds to a valid subframe, and
    wherein the valid subframe is a subframe included in the one of the two or more CSI measurement sets.

2. The method according to claim 1, wherein the aperiodic CSI reporting is performed via a physical uplink shared channel (PUSCH).

3. The method according to claim 1, wherein a size of the CSI request field is 2 bits.

4. The method according to claim 3, wherein the CSI request field indicates that the aperiodic CSI reporting is triggered for one of the two or more CSI measurement sets.

5. A user equipment (UE) for performing an aperiodic channel status information (CSI) reporting in a wireless access system, the UE comprising:
    a transmitter;
    a receiver; and
    a processor for supporting the aperiodic CSI reporting, wherein the processor is configured to:
        receive, through the receiver, a radio resource control (RRC) message configuring two or more CSI measurement sets, wherein each of the two or more CSI measurement sets includes two or more subframes,
        receive a physical downlink control channel (POCCH) including a CSI request field triggering the aperiodic CSI reporting for one of the two or more CSI measurement sets, and
        report, through the transmitter, CSI on a subframe 'n',
    wherein the CSI is related to a subframe 'n-$n_{CQI\_ref}$',
    wherein 'n-$n_{CQI\_ref}$' is a smallest value greater than or equal to a predetermined value such that the subframe 'n-$n_{CQI\_ref}$' corresponds to a valid subframe, and
    wherein the valid subframe is a subframe included in the one of the two or more CSI measurement sets.

6. The UE according to claim 5, wherein the aperiodic CSI reporting is performed via a physical uplink shared channel (PUSCH).

7. The UE according to claim 5, wherein a size of the CSI request field is 2 bits.

8. The UE according to claim 7, wherein the CSI request field indicates that the aperiodic CSI reporting is triggered for one of the two or more CSI measurement sets.

* * * * *

UNITED STATES PATENT AND TRADEMARK OFFICE
CERTIFICATE OF CORRECTION

PATENT NO. : 9,554,299 B2
APPLICATION NO. : 14/790814
DATED : January 24, 2017
INVENTOR(S) : Hanbyul Seo et al.

Page 1 of 1

It is certified that error appears in the above-identified patent and that said Letters Patent is hereby corrected as shown below:

In the Claims

In Claim 1, at Column 32, Line 28, change "n-n$_{CQI\_ref}$" to read --n$_{CQI\_ref}$--.

In Claim 5, at Column 32, Line 60, change "n-n$_{CQI\_ref}$" to read --n$_{CQI\_ref}$--.

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*